US009755705B2

(12) United States Patent
Hou et al.

(10) Patent No.: US 9,755,705 B2
(45) Date of Patent: Sep. 5, 2017

(54) METHOD AND APPARATUS FOR SUPPORTING MULTI-USER AND SINGLE-USER MIMO IN A WIRELESS COMMUNICATION SYSTEM

(75) Inventors: Jilei Hou, San Diego, CA (US); John E. Smee, San Diego, CA (US); Durga Prasad Malladi, San Diego, CA (US); Navid Hassanpour Ghady, New Haven, CT (US); Siddhartha Mallik, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 875 days.

(21) Appl. No.: 12/536,366

(22) Filed: Aug. 5, 2009

(65) Prior Publication Data

US 2010/0034146 A1 Feb. 11, 2010

Related U.S. Application Data

(60) Provisional application No. 61/087,066, filed on Aug. 7, 2008, provisional application No. 61/087,063, filed
(Continued)

(51) Int. Cl.
*H04W 4/00* (2009.01)
*H04B 7/024* (2017.01)
(Continued)

(52) U.S. Cl.
CPC .......... *H04B 7/024* (2013.01); *H04B 7/0417* (2013.01); *H04B 7/0452* (2013.01); *H04B 7/0626* (2013.01); *H04B 7/0639* (2013.01)

(58) Field of Classification Search
CPC .. H04B 7/0456; H04B 7/0465; H04B 7/0626; H04B 7/0634
(Continued)

(56) References Cited

U.S. PATENT DOCUMENTS 8,140,098 B2 3/2012 Gorokhov
8,208,364 B2 6/2012 Walton et al.
(Continued)

FOREIGN PATENT DOCUMENTS

CN 1787400 A 6/2006
CN 101095296 A 12/2007
(Continued)

OTHER PUBLICATIONS

Bell, A.S., et al., "Collaborative MIMO for LTE-A downlink", 3GPP Draft TSG RAN WG1 Meeting #53bis; R1-082501_DL Collaborative MIMO, 3rd Generation Partnership Project (3GPP), Warsaw, Poland; (Jun. 30, 2008), XP050110769.
(Continued)

*Primary Examiner* — Andrew Chriss
*Assistant Examiner* — Kenan Cehic

(57) ABSTRACT

Techniques for supporting distributed multiple-input multiple-output (MIMO) transmissions are described. In one design, a user equipment (UE) determines channel estimates for multiple cells and reports the channel estimates. The UE thereafter receives a data transmission sent by the multiple cells to the UE based on the channel estimates. The data transmission may include at least one data stream, and each data stream may be sent by one cell or the multiple cells to the UE. In another design, a UE determines first and second channel estimates for first and second cells, respectively, and reports the channel estimates. The UE then receives a first data transmission sent by the first cell to the UE based on the first channel estimate. The UE also receives a second data transmission sent by the second cell to another UE and steered away from the UE based on the second channel estimate.

55 Claims, 18 Drawing Sheets

Related U.S. Application Data on Aug. 7, 2008, provisional application No. 61/087,922, filed on Aug. 11, 2008.

(51) Int. Cl.
*H04B 7/0417* (2017.01)
*H04B 7/0452* (2017.01)
*H04B 7/06* (2006.01)

(58) Field of Classification Search
USPC .................................................. 370/310–350
See application file for complete search history.

(56) References Cited

U.S. PATENT DOCUMENTS

| | | | |
|---|---|---|---|
| 2002/0115464 | A1 | 8/2002 | Hwang et al. |
| 2003/0043732 | A1 | 3/2003 | Walton et al. |
| 2003/0125040 | A1 | 7/2003 | Walton et al. |
| 2003/0181170 | A1* | 9/2003 | Sim .................. H04B 7/0408 455/101 |
| 2004/0176097 | A1 | 9/2004 | Wilson et al. |
| 2005/0101259 | A1 | 5/2005 | Tong et al. |
| 2005/0152387 | A1 | 7/2005 | Utsunomiya et al. |
| 2006/0007889 | A1 | 1/2006 | Khan et al. |
| 2006/0012477 | A1 | 1/2006 | Woodall et al. |
| 2006/0104142 | A1 | 5/2006 | Gilton |
| 2006/0120477 | A1 | 6/2006 | Shen et al. |
| 2006/0291371 | A1 | 12/2006 | Sutivong et al. |
| 2007/0008933 | A1* | 1/2007 | Braun et al. ................. 370/335 |
| 2007/0026810 | A1 | 2/2007 | Love et al. |
| 2007/0097856 | A1 | 5/2007 | Wang et al. |
| 2007/0196072 | A1 | 8/2007 | Zhou et al. |
| 2007/0281746 | A1 | 12/2007 | Takano et al. |
| 2008/0037671 | A1 | 2/2008 | Lee et al. |
| 2008/0096488 | A1 | 4/2008 | Cho et al. |
| 2008/0167061 | A1* | 7/2008 | Mazzarese .......... H04B 7/0452 455/500 |
| 2008/0253490 | A1* | 10/2008 | Hafeez ................. H04B 7/0669 375/347 |
| 2009/0016425 | A1 | 1/2009 | Hui et al. |
| 2009/0185631 | A1* | 7/2009 | Choi et al. ................... 375/260 |
| 2009/0323773 | A1 | 12/2009 | Bala et al. |
| 2010/0035627 | A1 | 2/2010 | Hou et al. |
| 2010/0135366 | A1* | 6/2010 | Yuan .................. H04B 7/0845 375/148 |

FOREIGN PATENT DOCUMENTS

| | | |
|---|---|---|
| EP | 1206047 A2 | 5/2002 |
| EP | 1887712 A2 | 2/2008 |
| JP | 2002232353 A | 8/2002 |
| JP | 2003304577 A | 10/2003 |
| JP | 2005198213 A | 7/2005 |
| JP | 2008048403 A | 2/2008 |
| JP | 2008523665 A | 7/2008 |
| JP | 2009159585 A | 7/2009 |
| JP | 2011509571 A | 3/2011 |
| JP | 2012510233 A | 4/2012 |
| KR | 20070068300 A | 6/2007 |
| KR | 20080009071 A | 1/2008 |
| KR | 20080014213 A | 2/2008 |
| RU | 2209526 C2 | 7/2003 |
| RU | 2232472 C2 | 7/2004 |
| WO | 2006063138 A2 | 6/2006 |
| WO | 2006108703 A1 | 10/2006 |
| WO | 2007033997 A1 | 3/2007 |
| WO | 2007043459 A1 | 4/2007 |
| WO | WO-2007067107 A1 | 6/2007 |
| WO | 2007108080 A1 | 9/2007 |
| WO | WO-2009084921 A2 | 7/2009 |
| WO | 2010016607 A1 | 2/2010 |
| WO | WO-2010068374 A1 | 6/2010 |

OTHER PUBLICATIONS

Hyun, K.J., et al., "Efficient Feedback via Subspace-Based Channel Quantization for Distributed Cooperative Antenna Systems with Temporally Correlated Channels", EURASIP Journal on Advances in Signal Processing, Hindawi Publishing Corp, US, vol. 2008, Dec. 1, 2007 (Dec. 1, 2007), pp. 1-13, XP002527506 ISSN: 1687-6172.
International Search Report and Written Opinion—PCT/US2009/053162, International Search Authority—European Patent Office—dated Jan. 21, 2010.
Karakayali, M.K., et al., "Network Coordination for spectrally efficient Communications in Cellular Systems", Aug. 2006, IEEE Wireless Communications Magazine pp. 56-61.
Lucent A, "Collaborative MIMO", IEEE C802.16M-07/244R1, [Online] pp. 1-9, XP002559332 Jul. 11, 2007 Retrieved from the Internet: URL: http://wirelessman.org/tgm/index-older.html>.
NTT Docomo et al: "Downlink MIMO Scheme for Shared Data Channel in E-UTRA" 3GPP Draft; R1-063310 DL MIMO Scheme, 3rd Generation Partnership Project (3GPP), Mobile Competence Centre; 650, Route Des Lucioles; F-06921 Sophia-Antipolis Cedex ; France, vol. RAN WG1, No. Riga, Latvia; Nov. 2, 2006, Nov. 2, 2006 (Nov. 2, 2006), XP050103755.
Taiwan Search Report—TW098126771—TIPO—dated Apr. 24, 2013.
European Search Report—EP13199237—Search Authority—Munich—dated Mar. 12, 2014.
Taiwan Search Report—TW101145510—TIPO—dated Jun. 17, 2014.
Taiwan Search Report—TW101145510—TIPO—dated Feb. 26, 2015.
Alcatel-Lucent, "LTE-IMT advanced—Candidate Technologies", 3GPP TSG-RAN WG1#53, R1-081877, May 2008, 20 Pages.
Samsung: "Future 3GPP Radio Technologies for LTE-Advanced", 3GPP TSG-RAN WG1#53, R1-081722, May 14, 2008, 19 Pages, URL: http://www.3gpp.org/ftp/tsg_ran/WG1_RL1/TSGR1_53/Docs/R1-081722.zip.
Samsung: "Inter-cell Interference Management and Network MIMO", 3GPP TSG-RAN WG1#53b R1-082325, Jun. 24, 2008, 4 Pages, URL:http://www.3gpp.org/ftp/tsg_ran/WG1_RL1/TSGR1_53b/Docs/R1-082325.zip.

* cited by examiner

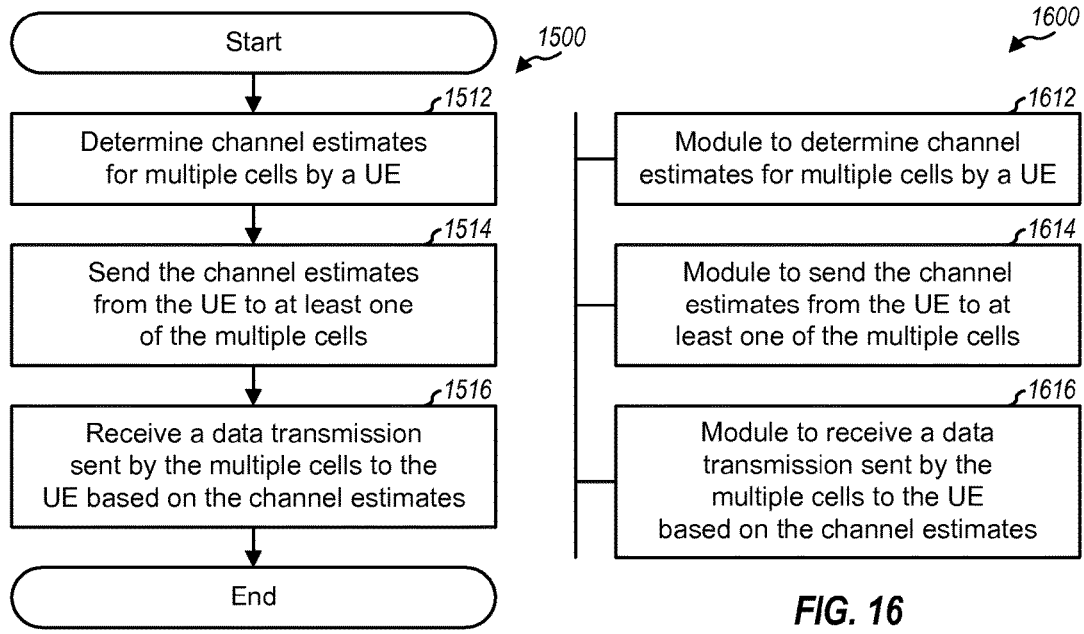
FIG. 15
FIG. 16
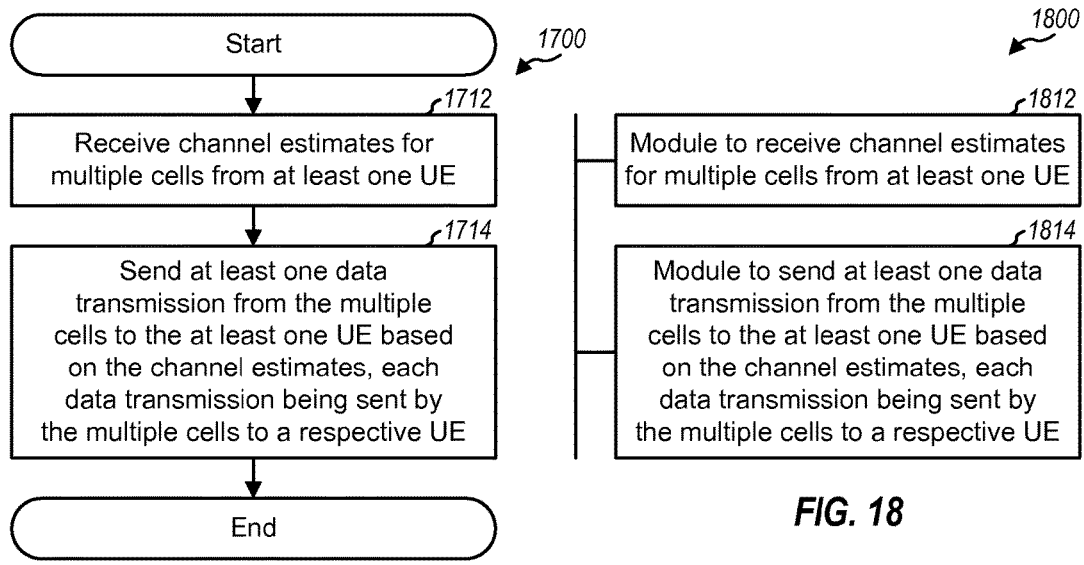
FIG. 17
FIG. 18

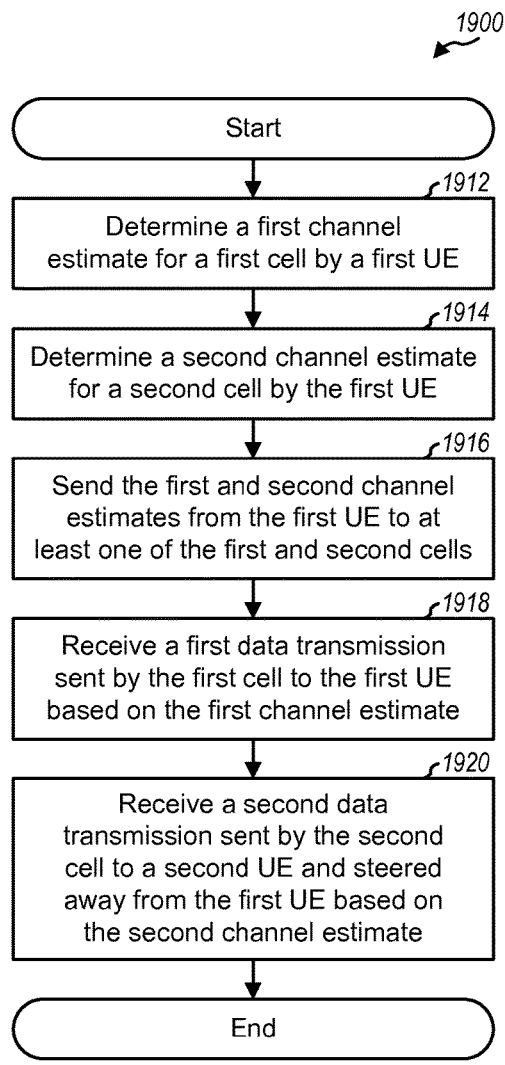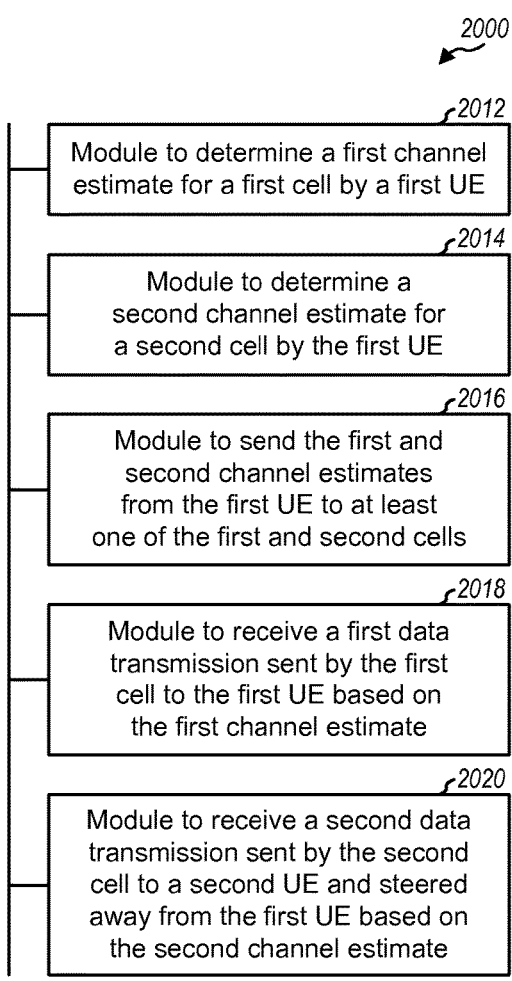
FIG. 19
FIG. 20

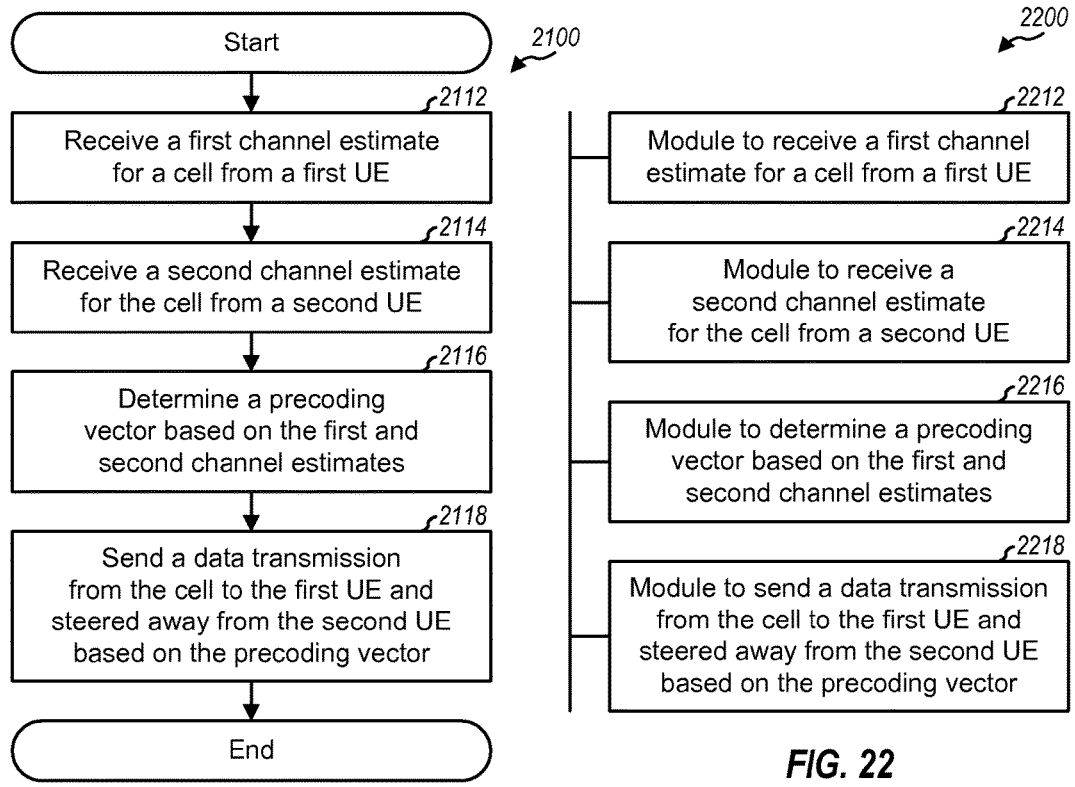
FIG. 21
FIG. 22
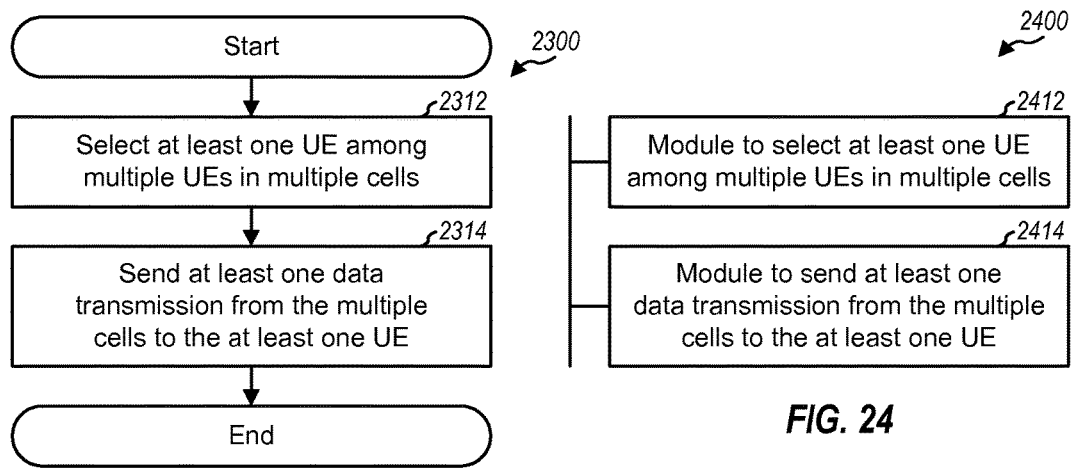
FIG. 23
FIG. 24

METHOD AND APPARATUS FOR SUPPORTING MULTI-USER AND SINGLE-USER MIMO IN A WIRELESS COMMUNICATION SYSTEM

The present application claims priority to provisional U.S. Application Ser. No. 61/087,066, entitled "INTER-CELL DOWN-LINK DISTRIBUTED MULTI-USER MIMO," filed Aug. 7, 2008, U.S. Application Ser. No. 61/087,063, entitled "INTER-CELL DOWN-LINK DISTRIBUTED SINGLE-USER MIMO," filed Aug. 7, 2008, and U.S. Application Ser. No. 61/087,922, entitled "METHOD AND APPARATUS FOR SUPPORTING DISTRIBUTED MIMO IN A WIRELESS COMMUNICATION SYSTEM," filed Aug. 11, 2008, all assigned to the assignee hereof and incorporated herein by reference.

BACKGROUND

I. Field

The present disclosure relates generally to communication, and more specifically to techniques for supporting data transmission in a wireless communication system.

II. Background

Wireless communication systems are widely deployed to provide various communication content such as voice, video, packet data, messaging, broadcast, etc. These wireless systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

A wireless communication system (e.g., a cellular system) may include a number of Node Bs that can support communication for a number of user equipments (UEs). A UE may communicate with a Node B via the downlink and uplink. The downlink (or forward link) refers to the communication link from the Node B to the UE, and the uplink (or reverse link) refers to the communication link from the UE to the Node B.

A UE may be within the coverage of multiple cells, where the term "cell" can refer to a coverage area of a Node B and/or a Node B subsystem serving the coverage area. One cell may be selected as a serving cell for the UE, and the remaining cells may be referred to as non-serving cells. The UE may observe strong interference from the non-serving cells. It may be desirable to transmit data to the UE in a manner to achieve good performance even in the presence of strong neighbor cells.

SUMMARY

Techniques for supporting single-user and multi-user distributed multiple-input multiple-output (MIMO) transmissions are described herein. For multi-user distributed MIMO (or MU-MIMO), multiple cells may concurrently send data transmissions to multiple UEs on the same time-frequency resources and may perform precoding to reduce interference to the UEs. For single-user distributed MIMO (or SU-MIMO), multiple cells may send a data transmission to a single UE on resources not used for data transmissions to other UEs. For both MU-MIMO and SU-MIMO, the cells may transmit data in different manners depending on the number of transmit antennas at each cell, the number of receive antennas at each UE, the level of coordination between the cells, etc.

In one design that may be applicable for both MU-MIMO and SU-MIMO, a UE may determine channel estimates for multiple cells, which may operate as a virtual cell for data transmission to the UE. The UE may report the channel estimates, e.g., to a serving cell. The UE may thereafter receive a data transmission sent by the multiple cells to the UE based on the channel estimates. In one design, the data transmission may comprise at least one data stream, and each data stream may be sent by the multiple cells to the UE. In another design, the data transmission may comprise multiple data streams, and each data stream may be sent by one cell to the UE. For MU-MIMO, the data transmission may be sent on resources that may be used to send another data transmission to another UE. For SU-MIMO, the data transmission may be sent on resources not used to send data transmissions to other UEs.

In another design that may be applicable for MU-MIMO, a first UE may determine a first channel estimate for a first cell and may also determine a second channel estimate for a second cell. The first UE may report the first and second channel estimates, e.g., to a serving cell. The first UE may receive a first data transmission sent by the first cell to the first UE based on the first channel estimate. The first UE may receive a second data transmission sent by the second cell to a second UE and steered away from the first UE based on the second channel estimate. The first and second data transmissions may be sent concurrently by the first and second cells on common resources. The first data transmission may be sent by the first cell based on a first precoding vector, which may be determined based on the first channel estimate from the first UE and a third channel estimate from a third UE not served by the first cell. The first data transmission may be steered away from the third UE by the first precoding vector. The second data transmission may be sent by the second cell based on a second precoding vector, which may be determined based on the second channel estimate from the first UE and a fourth channel estimate from the second UE.

Various aspects and features of the disclosure are described in further detail below.

BRIEF DESCRIPTION OF THE DRAWINGS

FIGS. 15 and 16 show a process and an apparatus for receiving data.
FIGS. 17 and 18 show a process and an apparatus for sending data.
FIGS. 19 and 20 show another process and apparatus for receiving data.
FIGS. 21 and 22 show another process and apparatus for sending data.
FIGS. 23 and 24 show a process and an apparatus for scheduling UEs.

DETAILED DESCRIPTION

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the systems and radio technologies mentioned above as well as other systems and radio technologies. For clarity, certain aspects of the techniques are described below for LTE.

Figure 1:
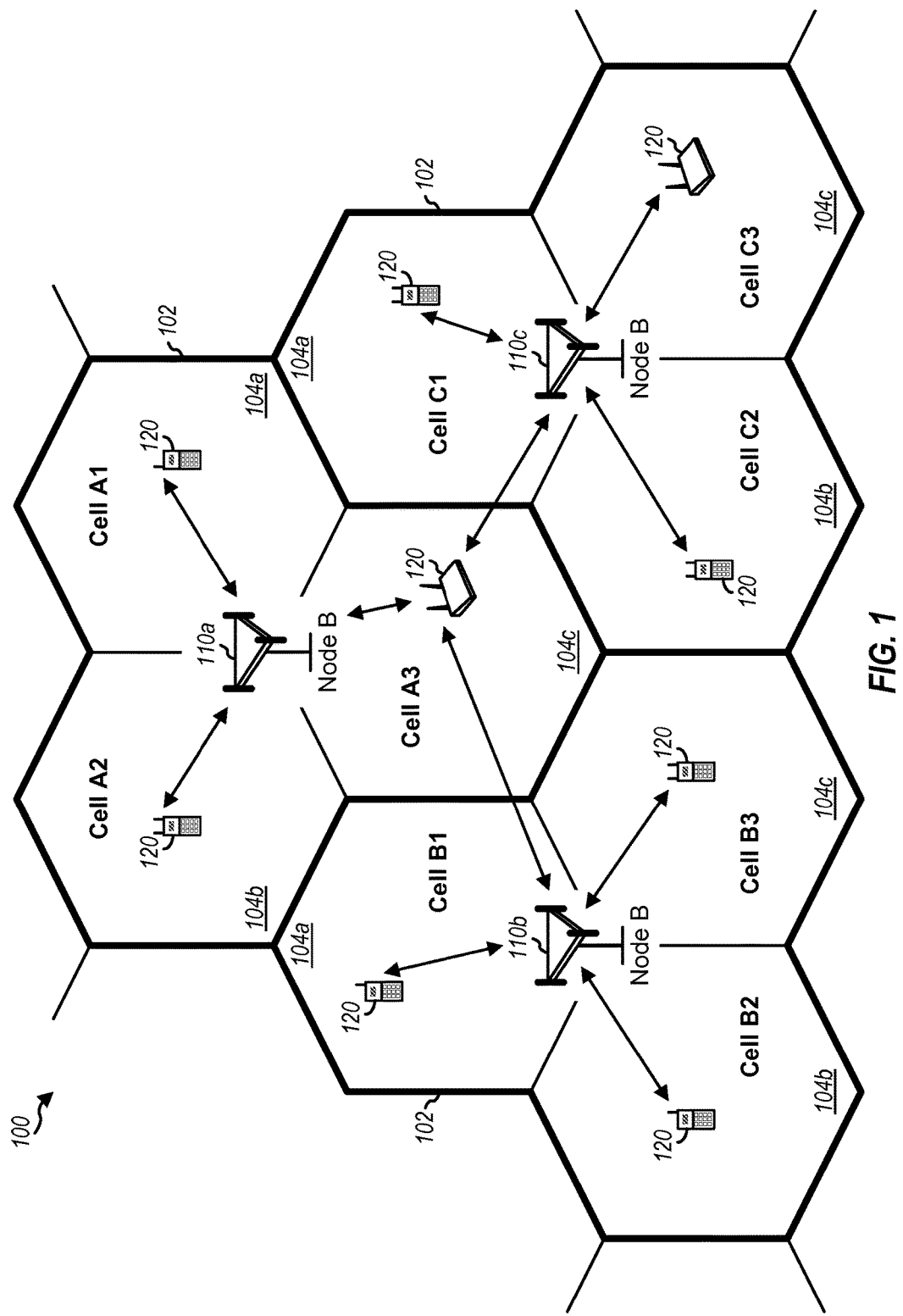
FIG. 1 shows a wireless communication system.

FIG. 1 shows a wireless communication system 100, which may be a cellular system such as an LTE system or some other system. System 100 may include a number of Node Bs and other network entities that can support communication services for a number of UEs. For simplicity, only three Node Bs 110a, 110b and 110c are shown in FIG. 1. A Node B may be a station that communicates with the UEs and may also be referred to as an evolved Node B (eNB), a base station, an access point, etc. Each Node B 110 may provide communication coverage for a particular geographic area 102. To improve system capacity, the overall coverage area of a Node B may be partitioned into multiple smaller areas, e.g., three smaller areas 104a, 104b and 104c. Each smaller area may be served by a respective Node B subsystem. In 3GPP, the term "cell" can refer to the smallest coverage area of a Node B and/or a Node B subsystem serving this coverage area. In 3GPP2, the term "sector" or "cell-sector" can refer to the smallest coverage area of a base station and/or a base station subsystem serving this coverage area. For clarity, 3GPP concept of cell is used in the description below. In general, a Node B may support one or multiple (e.g., three) cells.

A number of UEs may be dispersed throughout the system, and each UE may be stationary or mobile. For simplicity, FIG. 1 shows only one UE 120 in each cell. A UE may also be referred to as a mobile station, a terminal, an access terminal, a subscriber unit, a station, etc. A UE may be a cellular phone, a personal digital assistant (PDA), a wireless modem, a wireless communication device, a handheld device, a laptop computer, a cordless phone, a wireless local loop (WLL) station, etc. The terms "UE" and "user" are used interchangeably herein.

As shown in FIG. 1, sectorization may be performed to split the coverage area of each Node B into three cells in order to improve system capacity. For each cell, a directional antenna with a fixed beam pattern may be used to focus the transmit power of the cell and to reduce interference to other cells. The cells may operate independently without coordination among these cells, and each cell may transmit data to its UEs independently. Some UEs may be located at the boundary of neighbor cells and may be referred to as cell-edge UEs. The cell-edge UEs may observe strong inter-cell interference from non-serving cells and may suffer greatly due to the strong interference. This degradation may occur in both (i) intra-Node B scenarios in which the cells belong to the same Node B and (ii) inter-Node B scenarios in which the cells belong to different Node Bs.

Several schemes may be used to coordinate data transmissions to UEs in different cells, which may belong to the same Node B or different Node Bs. These schemes may exploit spatial dimension to reduce interference and improve the performance of the cell-edge UEs. For example, the following schemes may be used:

Multi-user distributed MIMO (or MU-MIMO)—send data transmissions from multiple cells to multiple UEs on the same time-frequency resources with beamsteering to reduce interference, and Single-user distributed MIMO (or SU-MIMO)—send a data transmission from multiple cells to a single UE on resources not used for data transmissions to other UEs.

Beamsteering is a process to control the spatial direction of a transmission toward a target receiver and/or away from an unintended receiver. Beamsteering may be performed by applying a precoding vector to the transmission at a transmitter, as described below.

Figure 2:
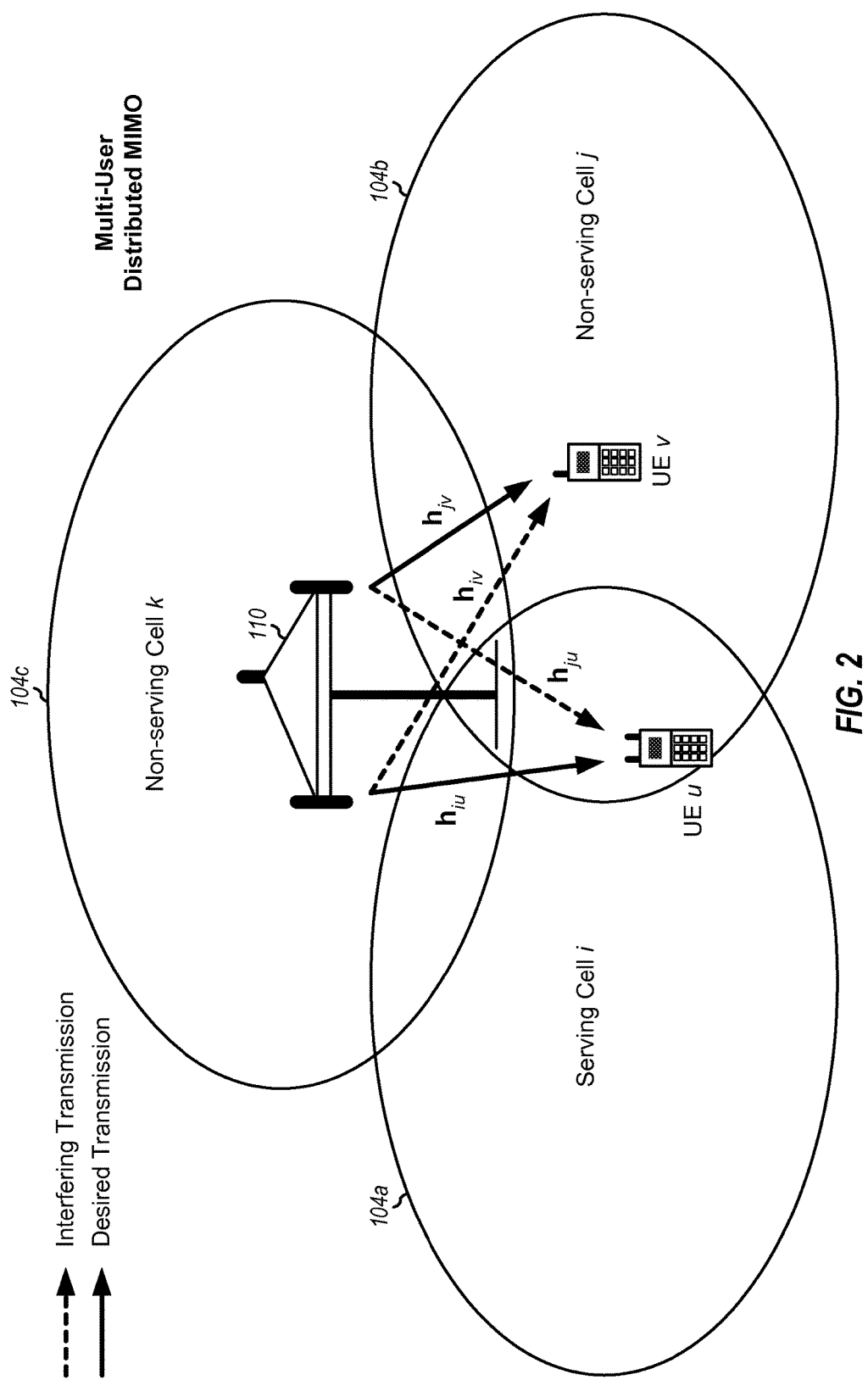
FIG. 2 shows downlink transmission for MU-MIMO.

FIG. 2 shows downlink transmission with MU-MIMO for one Node B with three cells i, j and k covering different geographic areas. The adjacent cells typically overlap one another at the edges, which may allow a UE to receive communication coverage from one or more cells at any location as the UE moves about the system. For simplicity, FIG. 2 shows only two UEs u and v. UE u is a cell-edge UE located at the boundary of cells i and j. Cell i may be selected as a serving cell for UE u, and cell j may be a non-serving cell for UE u. UE v is located within cell j. Cell j may be a serving cell for UE v, and cell i may be a non-serving cell for UE v. In general, a UE may be located within the coverage of any number of cells and may have any number of non-serving cells.

For MU-MIMO, multiple cells may transmit data to multiple UEs while reducing interference to UEs in other cells. For example, cell i may transmit data to UE u while reducing interference to UE v in neighbor cell j. Similarly, cell j may transmit data to UE v while reducing interference to UE u in neighbor cell i. Each cell may form spatial beams directed toward its UEs while reducing interference to UEs in neighbor cells. The UEs in the neighbor cells may then observe less inter-cell interference.

Figure 3:
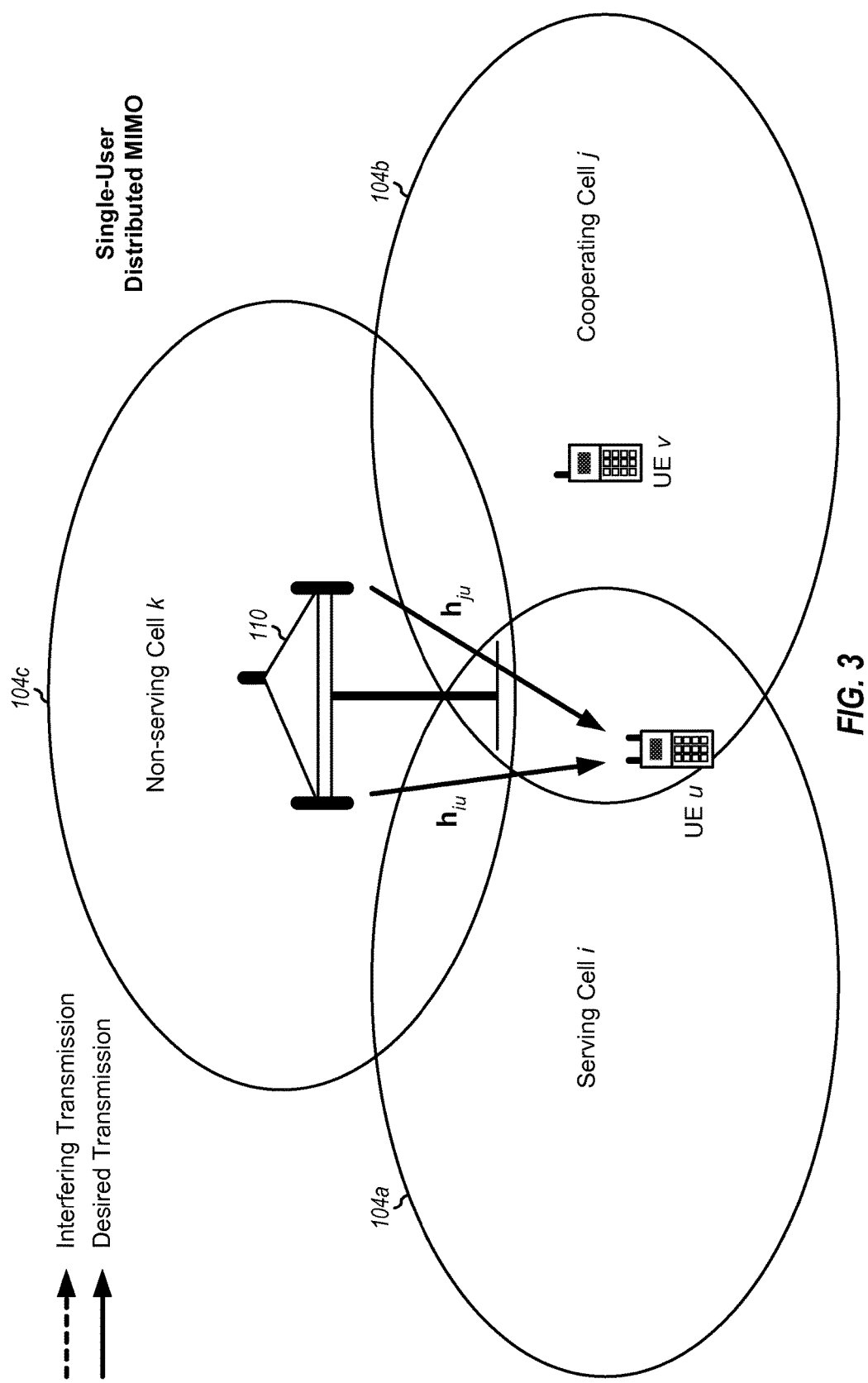
FIG. 3 shows downlink transmission for SU-MIMO.

FIG. 3 shows downlink transmission with SU-MIMO for one Node B with three cells i, j and k. For SU-MIMO, multiple cells may concurrently transmit one or more data streams to the same UE. In one design, both cells i and j may transmit one data stream to UE u, which may be equipped with a single receive antenna. In another design, cell i may transmit one data stream to UE u, and cell j may transmit another data stream to UE u, which may be equipped with multiple receive antennas. For both designs, the received power for both cells i and j at UE u would be desired power (instead of just serving cell i providing desired power and non-serving cell j providing interference power). Non-serving cell j may be referred to as a cooperating cell when transmitting data to UE u.

For simplicity, much of the description below is for data transmission to UE u, which may have one serving cell i and one or more non-serving cells with index j. In one MU-MIMO scheme, non-serving cell j may act as a cooperating cell, and cells i and j may both transmit data to UE u. In another MU-MIMO scheme, serving cell i may transmit data to UE u, and non-serving cell j may perform interference nulling for UE u. In one SU-MIMO scheme, both serving cell i and cooperating cell j may transmit data to UE u. These various MIMO schemes are described in detail below.

In general, each cell may be equipped with one or multiple transmit antennas. Each UE may also be equipped with one or multiple receive antennas. Data may be sent in different manners depending on the number of transmit antennas at each cell, the number of receive antennas at each UE, the level of cooperation between the cells, etc. For clarity, much of the description below covers data transmission by two cells i and j. The MIMO schemes described herein may be extended to more than two cells.

I. Multi-User Distributed MIMO

Figure 4:
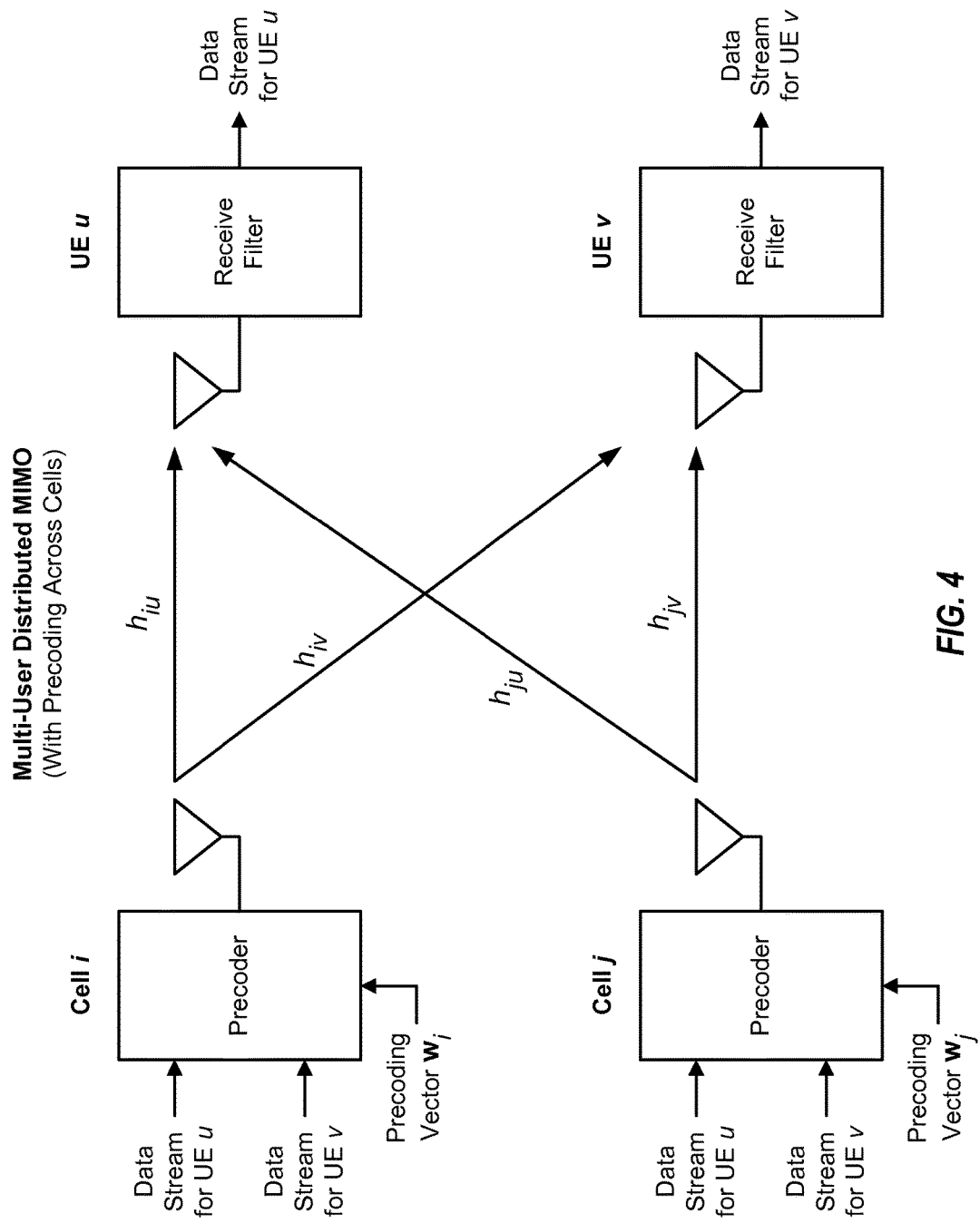
FIGS. 4 to 9 show MU-MIMO for various antenna configurations.

FIG. 4 shows a design of MU-MIMO with each cell equipped with a single transmit antenna and each UE equipped with a single receive antenna. Each UE may determine a complex channel gain for a single-input single-output (SISO) channel from the transmit antenna at each cell to its receive antenna. UE u may obtain a channel gain $h_{iu}$ for cell i and a channel gain $h_{ju}$ for cell j. Similarly, UE v may obtain a channel gain $h_{iv}$ for cell i and a channel gain $h_{jv}$ for cell j. The channel gain for each cell may be treated as a component of a virtual channel vector. UE u may obtain a virtual channel row vector $h_u=[h_{iu}\ h_{ju}]$, and UE v may obtain a virtual channel row vector $h_v=[h_{iv}\ h_{jv}]$. Conceptually, the two cells, each with a single transmit antenna, may be considered as a virtual cell with two transmit antennas.

In one MU-MIMO scheme with a single transmit antenna at each cell, a data stream may be sent to each UE from both transmit antennas at the two cells i and j (instead of from only one transmit antenna at one cell). Cell i may receive data streams u and v intended for UEs u and v, respectively. Cell i may perform precoding on the two data streams with a precoding vector $w_i$ to obtain an output stream and may send the output stream via its transmit antenna. Similarly, cell j may receive data streams u and v, perform precoding on the two data streams with a precoding vector $w_j$ to obtain an output stream, and send the output stream via its transmit antenna. Precoding vectors $w_i$ and $w_j$ may be determined in various manners.

In one design, the precoding vectors may be determined based on a zero-forcing (ZF) technique. A 2×2 virtual channel matrix may be formed as $$H_{eq} = \begin{bmatrix} h_u \\ h_v \end{bmatrix}.$$

A 2×2 precoding matrix $W_{zf}$ may be determined based on zero-forcing, as follows:

$$W_{zf} = \Lambda H_{eq}^H [H_{eq} H_{eq}^H]^{-1}, \qquad \text{Eq (1)}$$

where $\Lambda$ is a diagonal matrix that normalizes the transmit power of the two cells, and "$H$" denotes a Hermetian or conjugate transpose.

$W_{zf}$ includes two preceding vectors in two columns. One preceding vector in $W_{zf}$ may be provided as a preceding vector $w_{zf,i}$ for cell i, and the other preceding vector in $W_{zf}$ may be provided as a preceding vector $w_{zf,j}$ for cell j. If the virtual channel matrix is accurate, then UE u may observe little interference from cell j, and UE v may observe little interference from cell i.

In another design, a precoding vector $w_{mmse,i}$ for cell i may be determined based on a minimum mean square error (MMSE) technique, as follows:

$$w_{mmse,i} = \left( N_u I + P_i \sum_{v \neq u} h_v^H h_v \right)^{-1} h_u^H, \qquad \text{Eq (2)}$$

where $N_u$ is the noise observed by UE u, $P_i$ is the transmit power of cell i, and I is an identity matrix.

The MMSE precoding vector $w_{mmse,i}$ may maximize a signal-to-caused-interference ratio (SCIR) for cell i, which may be expressed as:

$$SCIR_i = \frac{|h_u w_i|^2 P_i}{\sum_{v \neq u} |h_v w_i|^2 P_i + N_u}. \qquad \text{Eq (3)}$$

As shown in equation (3), $SCIR_i$ is the ratio of the received power at UE u (the numerator) over the interference power at UE v plus noise at UE u (the denominator). Using $w_{mmse,i}$ for $w_i$ in equation (3) may maximize $SCIR_i$.

The preceding vectors for cells i and j may also be determined in other manners. For example, the preceding vectors may be determined based on a maximum ratio combining (MRC) technique, etc.

Cell i may perform precoding with its precoding vector $w_i$, as follows:

$$x_i = d_i w_i, \qquad \text{Eq (4)}$$

where $d_i$ is a 1×2 data vector comprising data symbols in data streams u and v, and $x_i$ is an output symbol for cell i.

Cell i may use $w_{zf,i}$ or $w_{mmse,i}$ or some other precoding vector for $w_i$ in equation (4). Precoding vector $w_i$ includes two precoding weights. One precoding weight may be applied to data steam u, and the other precoding weight may be applied to data steam v.

For a time division duplexed (TDD) system, the downlink and uplink share the same frequency channel, and the downlink channel response may be highly correlated with the uplink channel response. In this case, the cells may estimate $h_u$ and $h_v$ based on pilots sent on the uplink by UEs u and v. For a frequency division duplexed (TDD) system, the downlink and uplink use different frequency channels, and the downlink channel response may not correlate well with the uplink channel response. In this case, UE u may estimate $h_u$ and send it to its serving cell i, and UE v may estimate $h_v$ and send it to its serving cell j.

In one design, UE u may determine channel direction indicator (CDI) information as follows. UE u may first obtain an estimate of $h_u$, e.g., based on a reference signal or pilot received from each cell. UE u may divide the channel vector by its magnitude to obtain a unit norm vector, as follows:

$$\tilde{h}_u = \frac{h_u}{\|h_u\|}, \qquad \text{Eq (5)}$$

where $\|h_u\|$ is the magnitude of the virtual channel row vector $h_u$, and $\tilde{h}_u$ is a normalized virtual channel vector with unit magnitude.

UE u may select a channel vector $\hat{h}_u$ in a codebook of $2^B$ channel vectors that most closely matches $\tilde{h}_u$. UE u may then send a B-bit index of the selected channel vector as CDI information.

Figure 5:
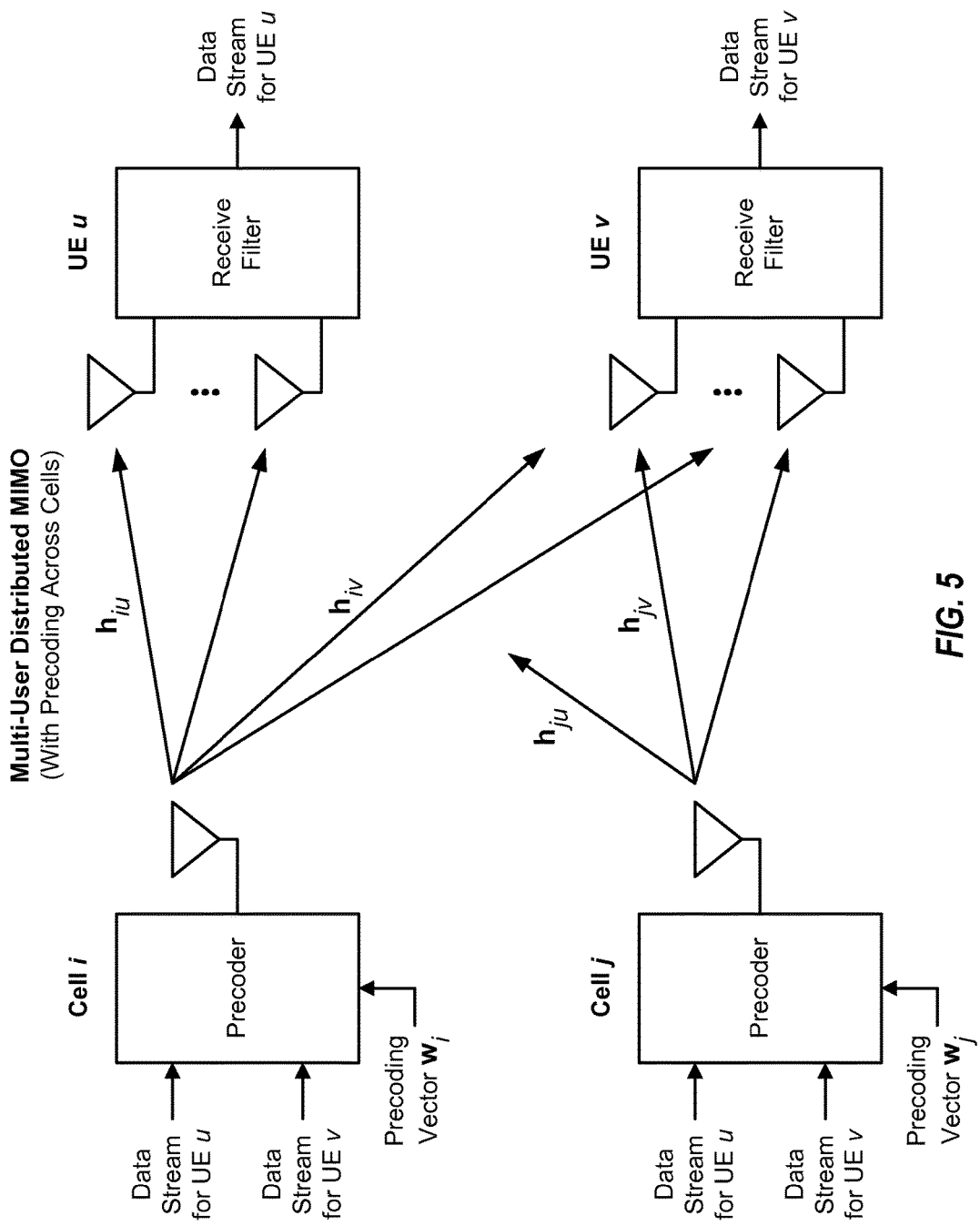

FIG. 5 shows a design of MU-MIMO with each cell equipped with a single transmit antenna and each UE equipped with multiple (R) receive antennas. Each UE may determine a channel response vector (or simply, a channel vector) for a single-input multiple-output (SIMO) channel from the transmit antenna at each cell to its R receive antennas. UE u may obtain an R×1 channel vector $h_{iu} = [h_{iu,1} \ldots h_{iu,R}]^T$ for cell i, where $h_{iu,r}$ for $r \in \{1, \ldots, R\}$ is a complex channel gain from the transmit antenna at cell i to receive antenna r at UE u, and "$T$" denotes a transpose. UE u may also obtain an R×1 channel vector $h_{ju}$ for cell j. UE u may determine an equivalent channel gain $h_{iu,eq}$ for cell i by applying a receive filter to $h_{iu}$. For example, UE u may determine $h_{iu,eq}$ by applying a dominant left eigenvector $u_u$ of a channel matrix for UE u, as follows:

$$h_{iu,eq} = u_u h_{iu}. \quad \text{Eq (6)}$$

The dominant left eigenvector may be determined as described below.

UE u may also determine an equivalent channel gain $h_{ju,eq}$ for cell j by applying the same dominant left eigenvector, as follows:

$$h_{ju,eq} = u_u h_{ju}. \quad \text{Eq (7)}$$

A virtual channel vector for UE u may then be formed as $h_u = [h_{iu,eq} \ h_{ju,eq}]$. The processing described above for the case of one receive antenna may be applied to $h_u$ obtained with multiple receive antennas at UE u.

Scheduling may be performed in various manners for the case in which each cell is equipped with a single transmit antenna. In one design, each cell may schedule its UEs independently and may select UEs for data transmission based on any set of criteria. At a beamforming/precoding stage, the selected UEs may be paired for joint transmission. Each UE pair may include one UE in one cell and another UE in another cell. Precoding vectors may be determined for the paired UEs and may be used to send data streams to these UEs, e.g., as described above.

In another design, a joint scheduler may operate across multiple cells. In one design of joint scheduling across two cells, the scheduler may first select a UE with a highest metric (e.g., based on fairness, etc.) among the UEs in the two cells. If the selected UE is in cell i, then the scheduler may select a compatible UE in the other cell j. To select a compatible UE, the scheduler may identify a subset of UEs in cell j whose channel vectors have small correlation relative to the channel vector of the selected UE in cell i. The scheduler may then select a UE with a highest metric from the subset of UEs in cell j. The scheduler may then pair the selected UE in cell i with the selected UE in cell j. This UE selection scheme may reduce power loss from precoding.

In one scheduling design, one UE may be selected from each cell, e.g., as described above. In another scheduling design, one or both UEs in a given cell may be selected, e.g., as long as both UEs have high metrics and their channel vectors have small correlation. For this scheduling design, a UE may be associated with a virtual cell (instead of a physical cell) and may be served by one or more physical cells in the virtual cell.

The designs described above can serve two UEs in two cells on the same time-frequency resources. These designs may be extended to serve three or more UEs in three or more cells on the same resources. The virtual channel vector for each UE may be dependent on the number of cells that will transmit to that UE. The precoding vector for each cell may be dependent on the virtual channel vectors for all UEs to which that cell will transmit data.

When each cell is equipped with multiple (T) transmit antennas, data may be sent with precoding in several manners. In a first MU-MIMO scheme, precoding may be performed across multiple cells. In a second MU-MIMO scheme, precoding may be performed by each cell.

Figure 6:
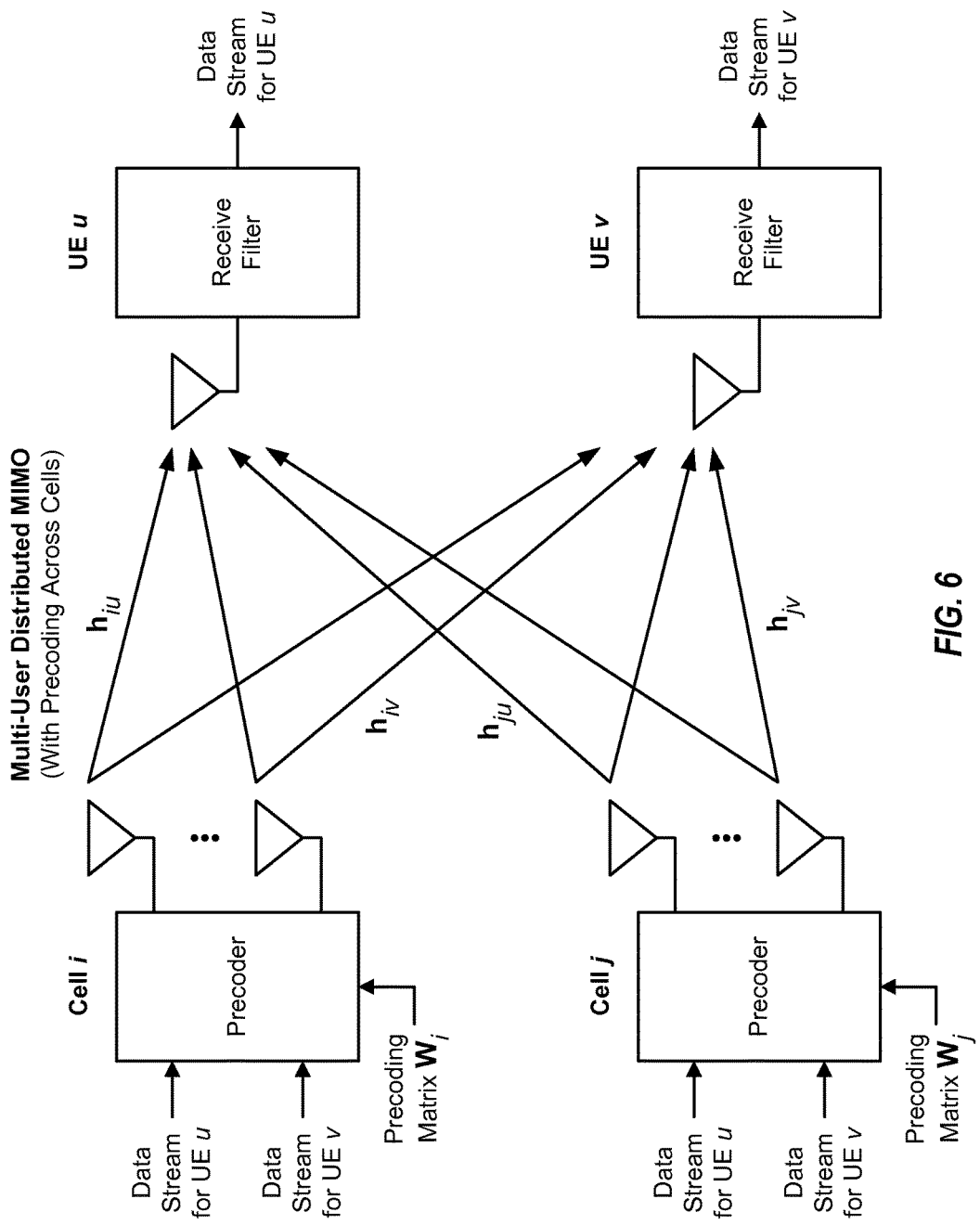

FIG. 6 shows a design of precoding across cells for the first MU-MIMO scheme, with each cell equipped with multiple (T) transmit antennas and each UE equipped with a single receive antenna. Each UE may determine a channel response row vector (or simply, a channel vector) for a multiple-input single-output (MISO) channel from the T transmit antennas at each cell to its receive antenna. UE u may obtain a channel vector $h_{iu} = [h_{iu,1} \ldots h_{iu,T}]$ for cell i, where $h_{iu,t}$ for $t \in \{1, \ldots, T\}$ is a complex channel gain from transmit antenna t at cell i to the receive antenna at UE u. UE u may also obtain a channel vector $h_{ju}$ for cell j. The channel vector for each cell may be treated as a component of a virtual channel vector. UE u may form a virtual channel vector $h_u = [h_{iu} \ h_{ju}]$. Similarly, UE v may obtain a channel vector $h_{iv}$ for cell i and a channel vector $h_{jv}$ for cell j and may form a virtual channel vector $h_v = [h_{iv} \ h_{jv}]$.

For the first MU-MIMO scheme, a data stream may be sent to each UE from the 2T transmit antennas at the two cells i and j (instead of from only T transmit antennas at one cell). Cell i may receive data streams u and v intended for UEs u and v, respectively. Cell i may perform precoding on the two data streams with a precoding matrix Wi to obtain T output streams and may send these T output streams via its T transmit antennas. Similarly, cell j may receive data streams u and v, perform precoding on the two data streams with a precoding matrix $W_j$ to obtain T output streams, and send these T output streams via its T transmit antennas. Precoding matrices $W_i$ and $W_j$ may be determined based on zero-forcing, MMSE, etc.

Figure 7:
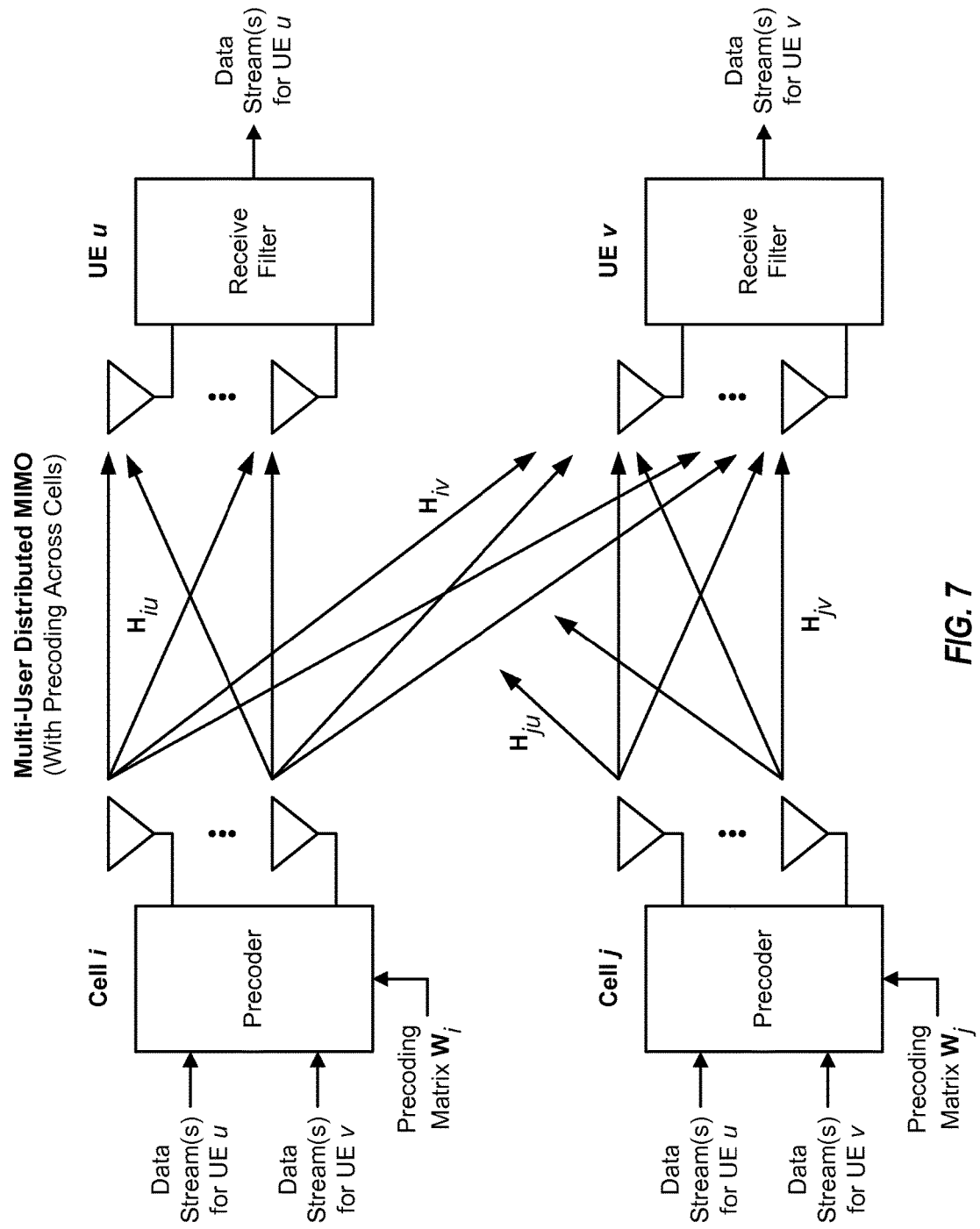

FIG. 7 shows a design of precoding across cells for the first MU-MIMO scheme, with each cell equipped with multiple (T) transmit antennas and each UE equipped with multiple (R) receive antennas. Each UE may determine a channel response matrix (or simply, a channel matrix) for a MIMO channel from the T transmit antennas at each cell to its R receive antennas. UE u may obtain an R×T channel matrix $H_{iu}$ for cell i and a channel matrix $H_{ju}$ for cell j. UE u may determine equivalent channel vectors $h_{iu}$ and $h_{ju}$ based on the channel matrices and a receive filter for UE u. Similarly, UE v may obtain a channel matrix $H_{iv}$ for cell i and a channel matrix $H_{jv}$ for cell j. UE v may determine equivalent channel vectors $h_{iv}$ and $h_{jv}$ based on the channel matrices and a receive filter for UE v.

In one design, singular value decomposition of channel matrix $H_{iu}$ may be expressed as:

$$H_{iu} = U_{iu} \Lambda_{iu} V_{iu}^H, \quad \text{Eq (8)}$$

where $U_{iu}$ is an R×R unitary matrix of left eigenvectors of $H_{iu}$, $\Lambda_{iu}$ is an R×T diagonal matrix of singular values of $H_{iu}$, and $V_{iu}$ is a T×T unitary matrix of right eigenvectors of $H_{iu}$.

A unitary matrix U is characterized by the property $U^H U = I$. The columns of U are orthogonal to one another, and each column has unit power. The diagonal elements of $\Lambda_{iu}$ are singular values that represent the channel gains of the eigenmodes of $H_{iu}$. The singular values in $\Lambda_{iu}$ may be ordered from largest to smallest along the diagonal. The vectors in $U_{iu}$ and $V_{iu}$ may be ordered in the same way as the singular values in $\Lambda_{iu}$. After ordering, the first column of $U_{iu}$ is the dominant left eigenvector and may be denoted as $u_{i,1}$. The first column of $V_{iu}$ is the dominant right eigenvector and may be denoted as $v_{i,1}$.

In one design, the channel vector $h_{iu}$ for serving cell i may be defined as:

$$h_{iu} = u_{i,1}^H H_{iu} = \lambda_{i,1} \cdot v_{i,1}^H, \qquad \text{Eq (9)}$$

where $\lambda_{i,1}$ is the largest singular value in $\Lambda_{iu}$.

For the design shown in equation (9), UE u may be assumed to perform MIMO receive filtering (or MIMO detection) by pre-multiplying its received signals with a receive filter $u_{i,1}$. $h_{iu}$ may then be an equivalent channel defined by a scaled version of the dominant right eigenvector $v_{i,1}$.

In one design, the channel vector $h_{ju}$ for non-serving cell j may be defined as:

$$h_{ju} = u_{i,1}^H H_{ju}. \qquad \text{Eq (10)}$$

In the design shown in equation (10), the channel vector $h_{ju}$ for non-serving cell j is obtained by applying the same receive filter $u_{i,1}$ to the channel matrix $H_{ju}$ for non-serving cell j.

For the case with multiple receive antennas at each UE, as shown in FIG. 7, precoding matrices $W_i$ and $W_j$ may be determined based on $h_{iu}$ and $h_{ju}$ and in accordance with zero-forcing, MMSE, etc. Cells i and j may then send data to UEs u and v with precoding matrices $W_i$ and $W_j$, respectively, in similar manner as for the case with a single receive antenna at each UE.

In one design, antenna permutation may be applied to data stream(s) sent to one UE in order to achieve symmetry, balance and/or robustness among the data streams. For antenna permutation, each data stream may be sent from different antennas in different time interval and/or different frequency subcarriers.

In general, two or more cells may simultaneously transmit data to two or more UEs with precoding across these cells. The number of data steams ($N_S$) that may be sent simultaneously to a given UE may be given as $N_S \leq \min\{N_T, N_R\}$, where $N_T$ is the total number of transmit antennas at all cells sending the data steams, and $N_R$ is the total number of receive antennas at the UE. If one data stream is sent to each UE, then more than one UE may be scheduled per cell as long as the total number of UEs to be served is less than or equal to the total number of transmit antennas ($N_T$) at all cells. The precoding matrix for each cell may be determined based on the virtual channel vectors from all UEs being served and may be derived with zero-forcing, MMSE, etc.

Scheduling may be performed in various manners for the case in which each cell is equipped with multiple transmit antennas. In one design, the number of UEs scheduled for data transmission may be equal to the number of cells, and one data stream may be sent to each scheduled UE. In this design, scheduling and UE selection may be performed as described above for the case in which each cell is equipped with one transmit antenna. In particular, each cell may perform scheduling independently, and one UE may be selected per cell, e.g., in a sequential order. Alternatively, scheduling may be performed jointly across cells, and UEs may be selected (e.g., in a sequential order) from among the UEs in these cells.

In another design, the number of UEs to serve may be greater than the number of cells and/or more than one data stream may be sent to a scheduled UE. In this design, a UE may send M virtual channel vectors in order to receive up to M data streams, where $M \geq 1$. Each virtual channel vector may be treated as if it is received from a single-antenna UE. UEs may then be selected, e.g., in a sequential order based on a metric. Additional constraints may be applied in scheduling. For example, scheduling may be performed such that at least one UE is selected from each cell, at most L data streams (e.g., L=2) is sent to a given UE, etc. The total number of data streams sent to all scheduled UEs may be less than or equal to the total number of transmit antennas ($N_T$) at all cells sending these data streams.

In general, if the UEs are well separated spatially, then it may be better to select more UEs with one data stream than to select fewer UEs with multiple data streams. Selecting more UEs may provide greater diversity gain while reducing precoding power loss.

For the second MU-MIMO scheme, precoding may be performed by each cell instead of across cells. Each cell may send a data stream to its UE and may perform beamforming in a manner to reduce interference to another UE served by another cell. For example, cell i may send a data stream to UE u and may perform beamforming to reduce interference to UE v. Similarly, cell j may send a data stream to UE v and may perform beamforming to reduce interference to UE u.

Figure 8:
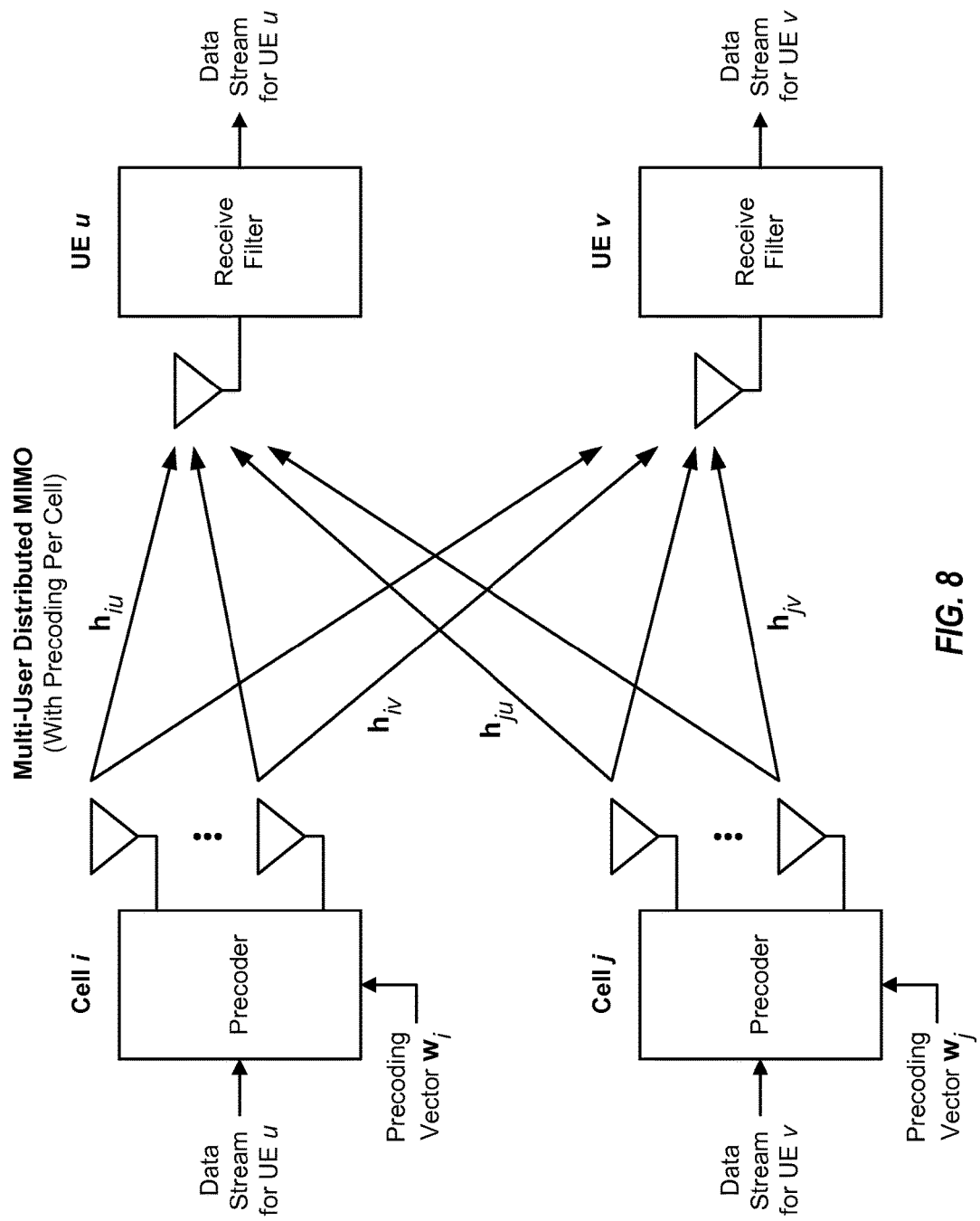

FIG. 8 shows a design of precoding per cell for the second MU-MIMO scheme, with each cell equipped with multiple (T) transmit antennas and each UE equipped with a single receive antenna. UE u may obtain a channel vector $h_{iu}$ for serving cell i and a channel vector $h_{ju}$ for non-serving cell j. Similarly, UE v may obtain a channel vector $h_{iv}$ for non-serving cell i and a channel vector $h_{jv}$ for serving cell j. A precoding vector $w_i$ for cell i may be determined based on channel vectors $h_{iu}$ for $h_{iv}$ such that a data transmission may be steered toward UE u and away from UE v.

In one design, the precoding vector for cell i may be determined based on MMSE, as follows:

$$w_{mmse,i} = \left(N_u I + P_i \sum_{v \neq u} h_{iv}^H h_{iv}\right)^{-1} h_{iu}^H. \qquad \text{Eq (11)}$$

The SCIR for cell i may be expressed as:

$$SCIR_i = \frac{|h_{iu} w_i|^2 P_i}{\sum_{v \neq u} |h_{iv} w_i|^2 P_i + (w_i^H w_i) N_u}. \qquad \text{Eq (12)}$$

The use of $w_{mmse,i}$ for $w_i$ would maximize the SCIR of the data transmission from cell i to UE u. $w_{mmse,i}$ may be used as a receive filter by cell i to maximize a signal-to-noise-and-interference ratio (SINR) if cell i were to receive a data transmission from UE u via channel $h_{iu}$ and an interfering transmission from UE v via channel $h_{iv}$.

In another design, the precoding vector for cell i may be determined based on zero-forcing, as follows:

$$w_{zf,i} = (\Lambda H_{i,eq}^H [H_{i,eq} H_{i,eq}^H]^{-1})_{first\ column}, \qquad \text{Eq (13)}$$

where $$H_{i,eq} = \begin{bmatrix} h_{iu} \\ h_{iv} \end{bmatrix}$$

is a 2×T virtual channel matrix for cell i.

As shown in equations (11) and (13), the precoding vector for cell i may be derived based on channel vectors $h_{iu}$ for $h_{iv}$ that are localized to cell i. Thus, each cell may make its decision independently at the beamforming/precoding level. For both MMSE and zero-forcing, if the channel vectors $h_{iu}$ and $h_{iv}$ are accurate, then UE v may observe little interference from cell i.

Figure 9:
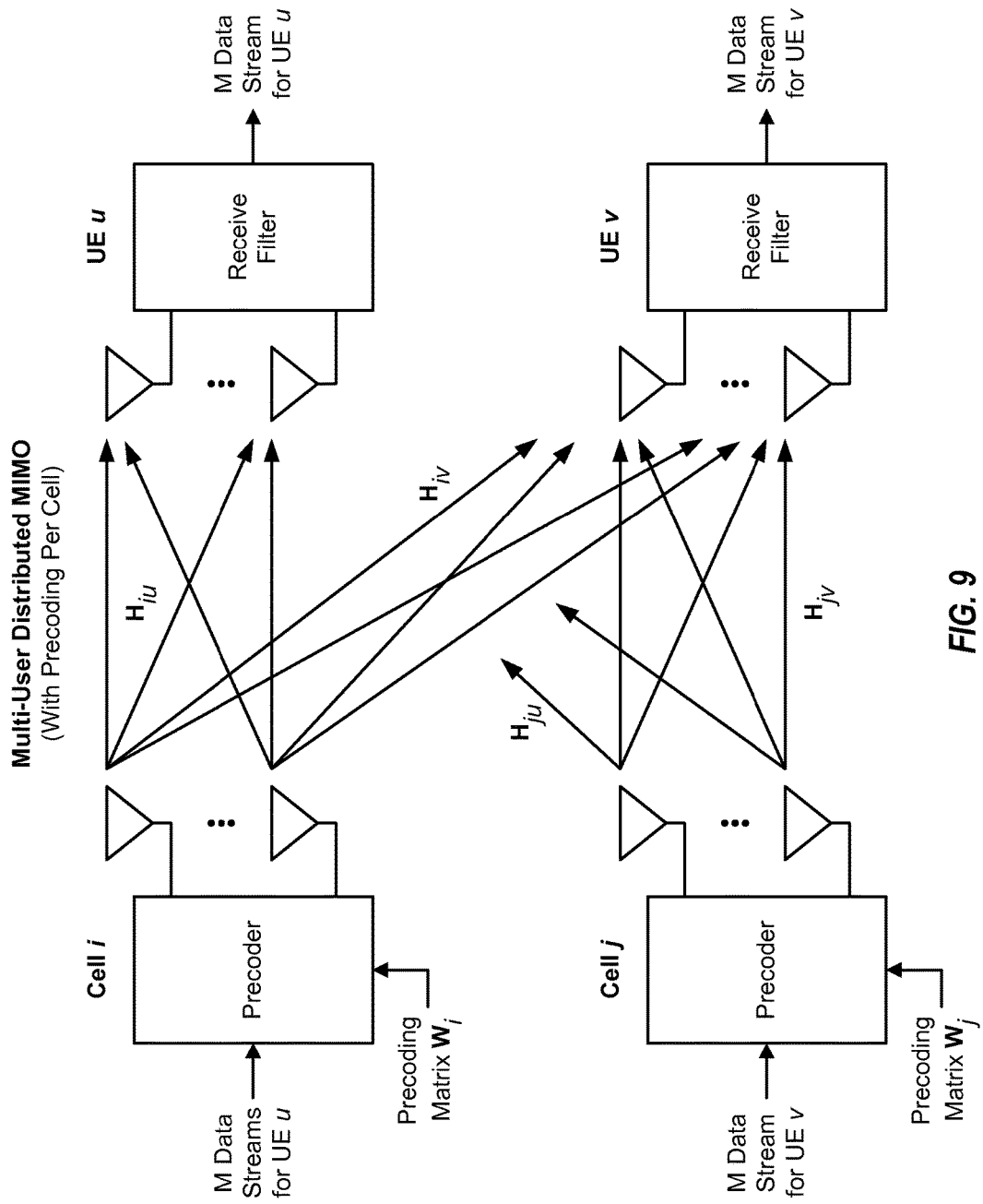

FIG. 9 shows a design of precoding per cell for the second MU-MIMO scheme, with each cell equipped with multiple (T) transmit antennas and each UE equipped with multiple (R) receive antennas. UE u may obtain a channel matrix $H_{iu}$ for cell i and a channel matrix $H_{ju}$ for cell j. Similarly, UE v may obtain a channel matrix $H_{iv}$ for cell i and a channel matrix $H_{jv}$ for cell j.

Cell i may transmit M data streams to UE u, where M≥1. Channel vectors $h_{iu,m}$ and $h_{ju,m}$ for the m-th data stream, where m ∈ {1, . . . , M}, may be expressed as:

$$h_{iu,m} = u_{i,m}^H H_{iu} = \lambda_{i,m} \cdot v_{i,m}^H, \text{ and} \qquad \text{Eq (14)}$$

$$h_{ju,m} = u_{i,m}^H H_{ju}. \qquad \text{Eq (15)}$$

A precoding vector for the m-th data stream may be determined based on MMSE, as follows:

$$w_{mmse,m} = \left(N_u I + P_i \sum_{v \ne u} h_{iv,m}^H h_{iv,m}\right)^{-1} h_{iu,m}^H. \qquad \text{Eq (16)}$$

A precoding vector for the m-th data stream may also be determined based on zero-forcing. In this case, a 2M×R equivalent channel matrix may be defined as $H_{i,eq} = [h_{iu,1}^T \ldots h_{iu,M}^T h_{iv,1}^T \ldots h_{iv,M}^T]^T$. The precoding vector for the m-th data stream may then be determined as follows:

$$w_{zf,m} = (\Lambda H_{i,eq}^H [H_{i,eq} H_{i,eq}^H]^{-1})_{m\text{-th column}}. \qquad \text{Eq (17)}$$

As shown in FIG. 9, cell i may transmit M data streams to UE u based on a precoding matrix $W_i$ for cell i. $W_i$ may be determined based on zero-forcing, MMSE, etc. Similarly, cell j may transmit M data streams to UE v based on a precoding matrix $W_j$ for cell j. $W_j$ may also be determined based on zero-forcing, MMSE, etc. Cells i and j may transmit the same or different numbers of data streams to UEs u and v, respectively.

The number of data streams (M) to send to UE u may be equal to or less than the number of receive antennas at UE u. M may be selected such that at least one receive dimension (or degree of freedom) will be available for suppression of residual inter-UE interference. In addition, cell i may send data to more than one UE as long as the total number of UEs served by cell i is equal to or less than the number of transmit antennas (T) at cell i, assuming one data stream per UE.

Scheduling may be performed in various manner when each cell is equipped with multiple transmit antennas. In one design, each cell may independently schedule its UEs and may inform the neighbor cells of the scheduled UEs. Each cell may examine UEs (or data streams) to be served by the neighbor cells and may perform beamforming for its UEs based on the channel vectors from its UEs as well as the channel vectors from the UEs in the neighbor cells in order to reduce interference to the UEs in the neighbor cells.

In another design, scheduling may be performed across multiple cells. In this design, a scheduler may first select a UE (or a data stream) with a highest metric in the multiple cells. The scheduler may then select another UE with a high metric and small correlation between its channel vector and the channel vector of the selected UE. The scheduler may select each subsequent UE (or data stream) in similar manner until all UEs (or data streams) are selected. This design may reduce power loss from precoding. Certain restrictions may be applied, e.g., to limit one UE per cell, to limit at most L data streams per UE, etc. One or more cells may be shut off in case there are new compatible UEs, which may be considered as adaptive factional frequency reuse (FFR).

In a third MU-MIMO scheme with multiple (T) transmit antennas at each cell, the precoding vectors for cells in the same Node B may be selected jointly across these cells. In one design, a codebook of precoding vectors may be available for use. One precoding vector may be selected for each cell based on one or more selection criteria. In one design, a selection criterion of maximizing a sum rate or a harmonic mean of rates for UEs may be used to select the precoding vectors. The sum rate R for a set of UEs may be expressed as:

$$R = \sum_l \log(1 + \text{SINR}_l), \qquad \text{Eq (18)}$$

and $$\text{SINR}_l = \frac{|h_{il} w_l|^2 P_i}{N_l + \sum_{j \ne i} |h_{jl} w_j|^2 P_j}, \qquad \text{Eq (19)}$$

where $\text{SINR}_l$ is the SINR of UE l and l ∈ {u, v, . . . }.

In one design, a set of UEs may be selected for data transmission, e.g., based on their metrics. The sum rate may then be computed for different sets of precoding vectors for the cells for the selected set of UEs. The set of precoding vectors that provides the highest sum rate may be selected for use. In another design, the UEs may be selected in a sequential order. For example, the UE with the highest metric (e.g., the largest SINR) may first be selected. The precoding vector for this UE may be determined based on zero-forcing or MMSE to reduce interference caused to a second UE. The precoding vector for the second UE may be selected from the codebook, e.g., to maximize the sum rate. Scheduling may also be performed as described above for the second MU-MIMO scheme.

For all of the MU-MIMO schemes described above, UE u may be equipped with multiple receive antennas and may apply a receive filter (e.g., a dominant left eigenvector) to obtain equivalent channel vectors for feedback purpose. Cell i may obtain equivalent channel vectors from UE u as well as UE v in cell j. Cell i may derive a precoding vector for UE u based on the equivalent channel vectors from UEs u and v. Similarly, cell j may derive a precoding vector for UE v based on the equivalent channel vectors from UE v and u. If the equivalent channel vectors are accurate, then UE u may observe little interference from cell j after applying the receive filter. However, the actual channel observed by UE u may be different from the equivalent channels assumed by cells i and j. This discrepancy may be due to various factors such as quantization errors, channel variations, channel estimation errors, etc.

In one design, UE u may derive a receive filter based on MMSE, as follows:

$$q_{mmse,m} = \left(N_u I + P_j \sum_{j \ne i} h_{ju,m}^H h_{ju,m}\right)^{-1} h_{iu,m}^H, \qquad \text{Eq (20)}$$

where $q_{mmse,m}$ is an MMSE receive filter for data stream m.

The MMSE receive filter may null out residual interference due to mismatches between the actual channel and the equivalent channel. If only one data stream is sent to UE u, then R-1 receive antennas at UE u may be used for interference suppression purpose. UE u may perform receive filtering with the MMSE receive filter, as follows:

$$d_{u,m} = q_{mmse,m}^H r_u,\qquad \text{Eq (21)}$$

where $r_u$ is a vector of received symbols obtained via the R receive antennas at UE u, and $d_{u,m}$ is a detected symbol for data stream m.

II. Single-User Distributed MIMO

For SU-MIMO, multiple cells may cooperate to send one or more data streams to a given UE. These cells may send a single data stream to the UE via more transmit antennas to obtain beamforming gain. These cells may also send more than one data stream to the UE to improve data performance.

Figure 10:
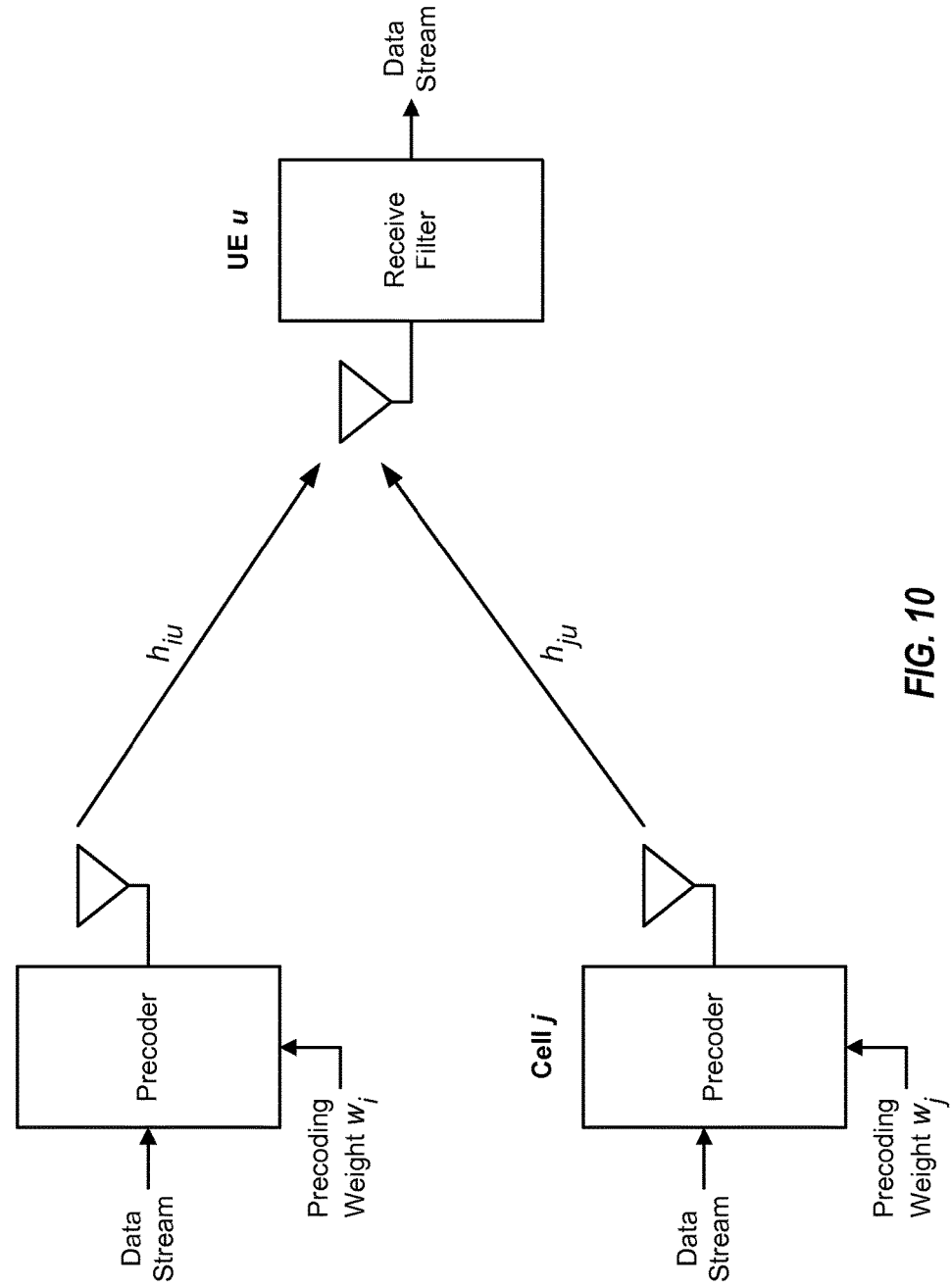
FIGS. 10 to 13 show SU-MIMO for various antenna configurations.

FIG. 10 shows a design of SU-MIMO with each cell equipped with a single transmit antenna and UE u equipped with a single receive antenna. UE u may obtain a channel gain $h_{iu}$ for cell i and a channel gain $h_{ju}$ for cell j. UE u may form a virtual channel vector $h_u = [h_{iu}\ h_{ju}]$.

In one SU-MIMO scheme with a single transmit antenna at each cell, a data stream may be sent to UE u from both transmit antennas at the two cells i and j. A precoding vector $w_u$ may be derived for UE u based on the virtual channel vector $h_u$ (e.g., $w_u = [w_i\ w_j]^T = h_u^H = [h^*_{iu}\ h^*_{ju}]^T$) and may include two weights for the two cells i and j. Cell i may apply one weight $w_i$ to the data stream sent to UE u, and cell j may apply the other weight $w_j$ to the same data stream sent to UE u. Only one data stream may be sent to UE u from the two cells since UE u is equipped with one receive antenna. Cell j does not serve any UE on the time-frequency resources used for UE u.

If UE u is equipped with multiple (R) receive antennas, then multiple data streams may be sent to UE u in several manners. In a first SU-MIMO scheme, multiple data streams may be sent with precoding across multiple cells. In a second SU-MIMO scheme, multiple data streams may be sent with precoding per cell.

Figure 11:
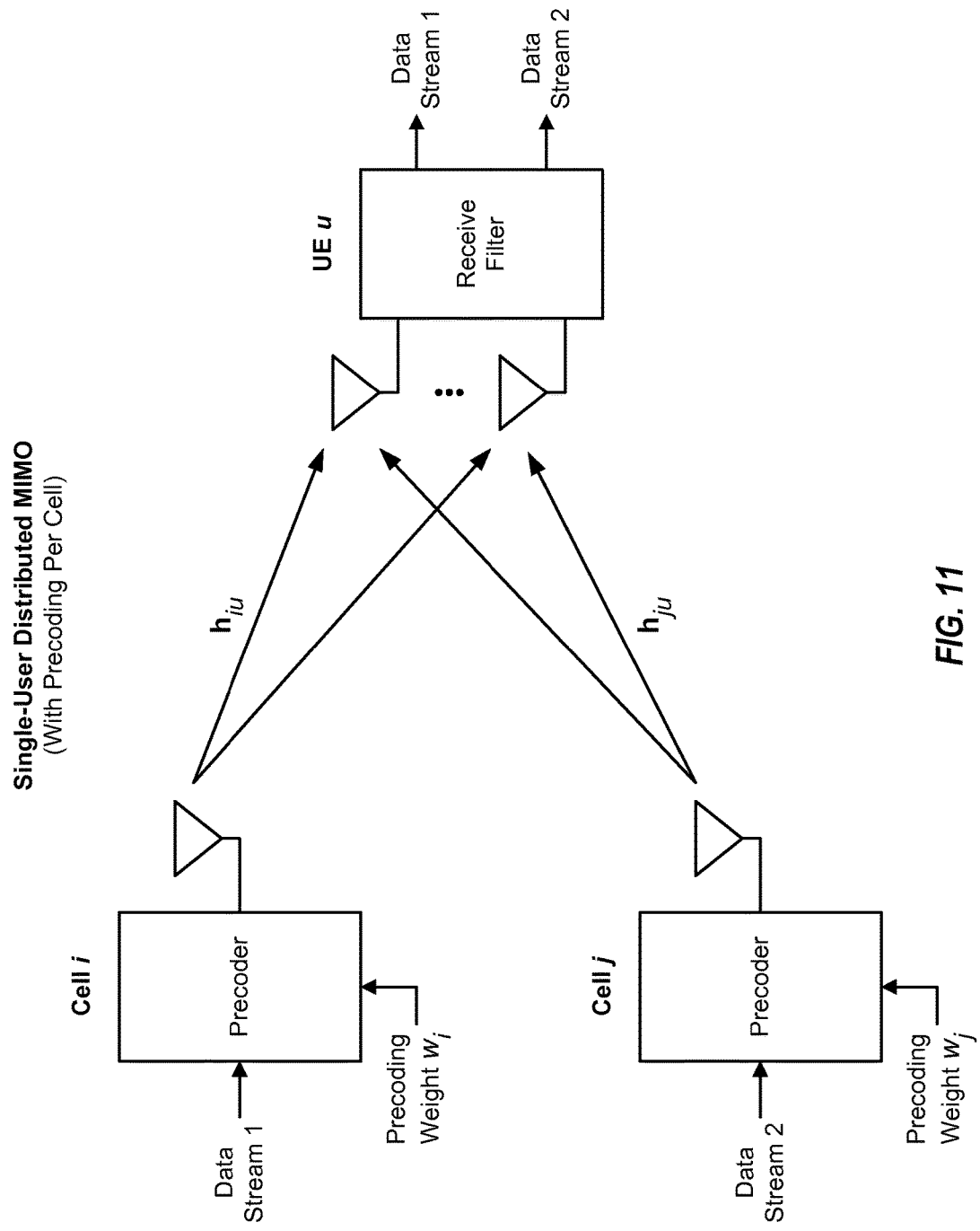

FIG. 11 shows a design of the second SU-MIMO scheme, with each cell equipped with a single transmit antenna and UE u equipped with multiple (R) receive antennas. UE u may obtain a channel vector $h_{iu}$ for cell i and a channel vector $h_{ju}$ for cell j. UE u may determine the SINR for each cell based on the channel vector for that cell. The SINR for each cell may be dependent on a receive filter used by UE u, which may be zero-forcing, MMSE, MMSE with successive interference cancellation (SIC), maximum likelihood detection (MLD), some other receive filter. UE u may determine channel quality indicator (CQI) information for each cell based on the SINR for that cell and may send CQI information for cells i and j. Cell i may send one data stream to UE u at a rate determined based on the CQI information for cell i. Cell j may send another data stream to UE u at a rate determined based on the CQI information for cell j. UE u may perform receive filtering based on zero-forcing, MMSE, MMSE-SIC, etc., to recover the two data streams sent by the two cells to UE u.

Figure 12:
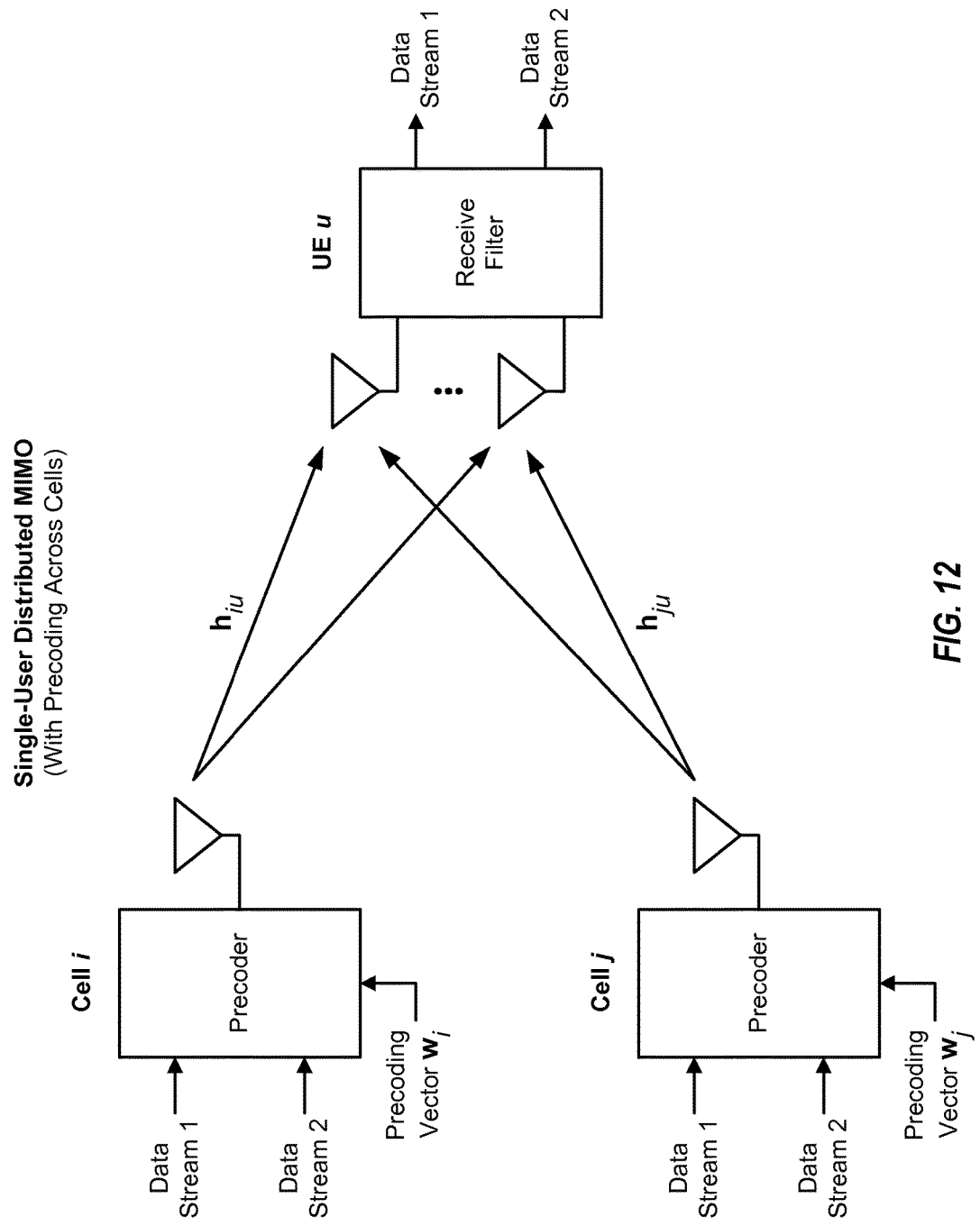

FIG. 12 shows a design of the first SU-MIMO scheme, with each cell equipped with a single transmit antenna and UE u equipped with multiple (R) receive antennas. UE u may obtain a channel vector $h_{iu}$ for cell i and a channel vector $h_{ju}$ for cell j. UE u may obtain a 2×R channel matrix for the two cells as $$H_u = \begin{bmatrix} h_{iu} \\ h_{ju} \end{bmatrix}$$

and may determine the SINRs for the two cells jointly. UE u may determine CQI information for two spatial layers based on the channel matrix and may send the CQI information as feedback.

Two data streams may be sent by cells i and j to UE u in several manners. In one design that is shown in FIG. 12, each data stream may be sent from both cells with precoding. A 2×2 precoding matrix $W_u$ may be derived for UE u based on the channel matrix $H_u$, e.g., using zero-forcing, MMSE, etc. Each data stream may be sent from the two transmit antennas at cells i and j based on one row of $W_u$, which is a precoding vector for both transmit antennas at the two cells i and j. Each cell may perform precoding for the two data streams based on a precoding vector corresponding to one column of $W_u$.

In another design that is not shown in FIG. 12, each data stream may be sent by the two cells with antenna permutation (and no precoding) in order to increase spatial symmetry between the different data streams.

Figure 13:
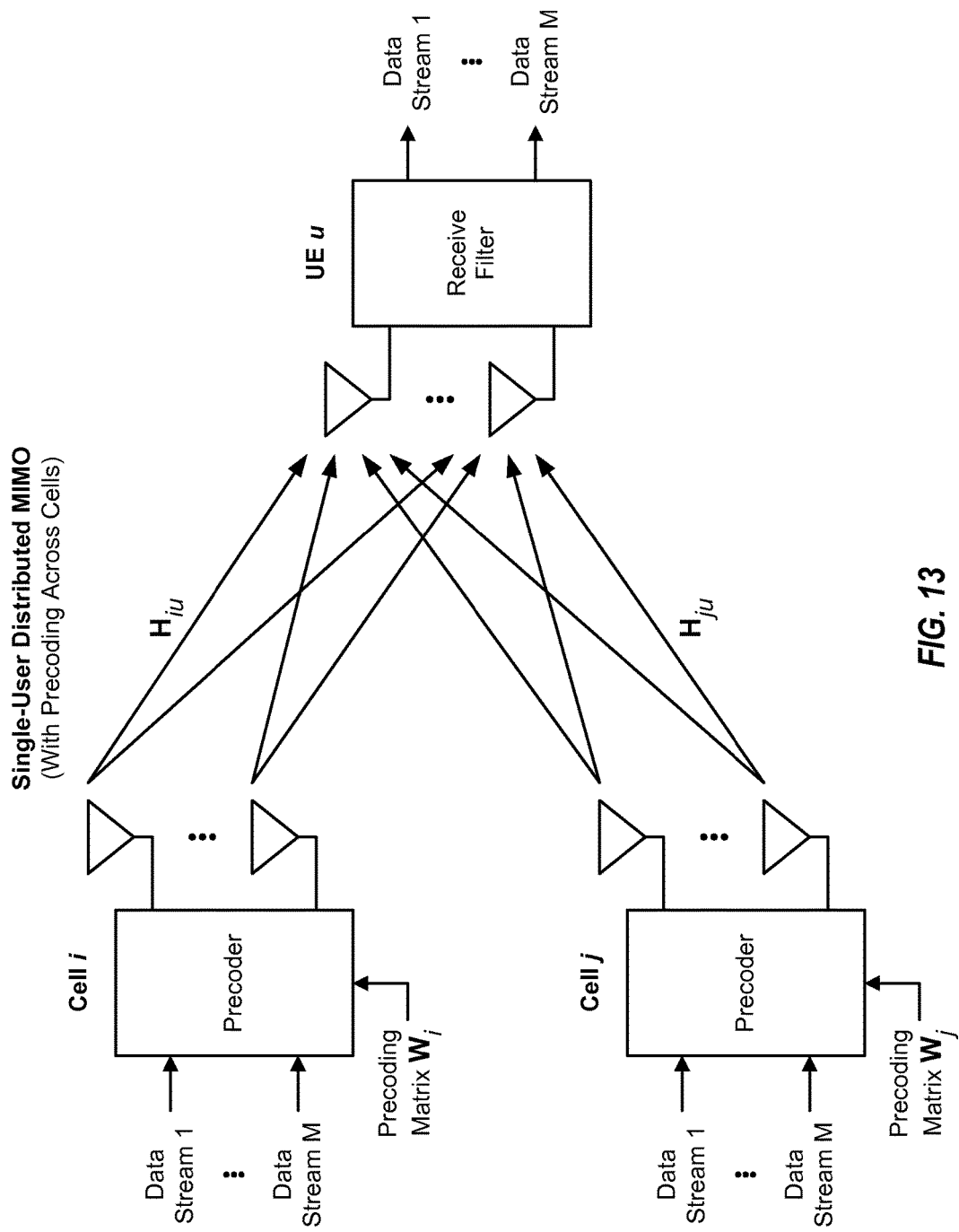

FIG. 13 shows a design of the first SU-MIMO scheme, with each cell equipped with multiple (T) transmit antennas and UE u equipped with multiple (R) receive antennas. UE u may obtain a channel matrix $H_{iu}$ for cell i and a channel matrix $H_{ju}$ for cell j. UE u may treat the channel matrices for the two cells jointly and may determine the SINRs for M spatial layers, where M≥1. UE u may determine CQI information for the M spatial layers based on the SINRs and may send the CQI information as feedback. The total number of transmit antennas at the two cells may be larger than the number of receive antennas at UE u. UE u may then determine the precoding matrices for the two cells and may send the precoding matrices to the cells. The two cells may send M data streams to UE u in accordance with the CQI information and the precoding matrices.

For the second SU-MIMO scheme, which is not shown in FIG. 13, each cell may send one or more data streams to UE u and may perform precoding for each data stream sent to UE u. For both the first and second SU-MIMO schemes, UE u may perform receive filtering based on zero-forcing, MMSE, MMSE-SIC, etc., to recover the data streams sent by the two cells.

For all MIMO schemes described above, UE u may obtain channel estimates for multiple cells. The channel estimate for each cell may comprise a channel gain, a channel vector, a channel matrix, etc. In one design, UE u may map a channel vector $h_{iu}$ for cell i to a channel vector $\hat{h}_{iu}$ in a codebook and may send $\hat{h}_{iu}$ as CDI information for cell i. Similarly, UE u may map a channel vector $h_{ju}$ for cell j to a channel vector $\hat{h}_{ju}$ in the codebook and may send $\hat{h}_{ju}$ as CDI information for cell j. In another design, UE u may determine one or more precoding vectors for one or more cells based on the channel estimates and may send the precoding vector(s) as feedback. This design may be more applicable for the SU-MIMO schemes with multiple transmit antennas at each cell, since the total number of transmit antennas may be greater than the number of receive antennas at UE u.

For all MIMO schemes described above, UE u may estimate the SINR for each data stream to be sent to UE u. UE u may determine CQI information for all M data streams to be sent to UE u based on the SINR for each data stream. The SINR and hence the CQI information may be determined based on a particular receive filter used by UE u. The CQI information may indicate the SINR or data rate for each data stream and/or other information. UE u may send the CQI information to the serving cell and/or the cooperating cell(s). The serving cell and possibly the cooperating cell(s) may send the M data streams at data rates selected in accordance rate the CQI information to UE u.

UE u may send feedback information (e.g., CQI and CDI information) to support MU-MIMO or SU-MIMO. For MU-MIMO, UE u may send CQI information for the serving cell and CDI information for the serving cell and cooperating cell(s). For SU-MIMO, UE u may send CQI and CDI information for the serving cell and cooperating cell(s), where the CDI information may represent phase rather than amplitude. In one design, UE u may send the feedback information to the serving cell, which may forward the feedback information for the cooperating cell(s) via the backhaul to the cooperating cell(s). In another design, UE u may send the feedback information for each cell directly to that cell.

The techniques described herein may be used to support distributed MIMO from multiple cells in the same Node B or different Node Bs, as described above. The techniques may also be used to support distributed MIMO in a distributed antenna system.

Figure 14:
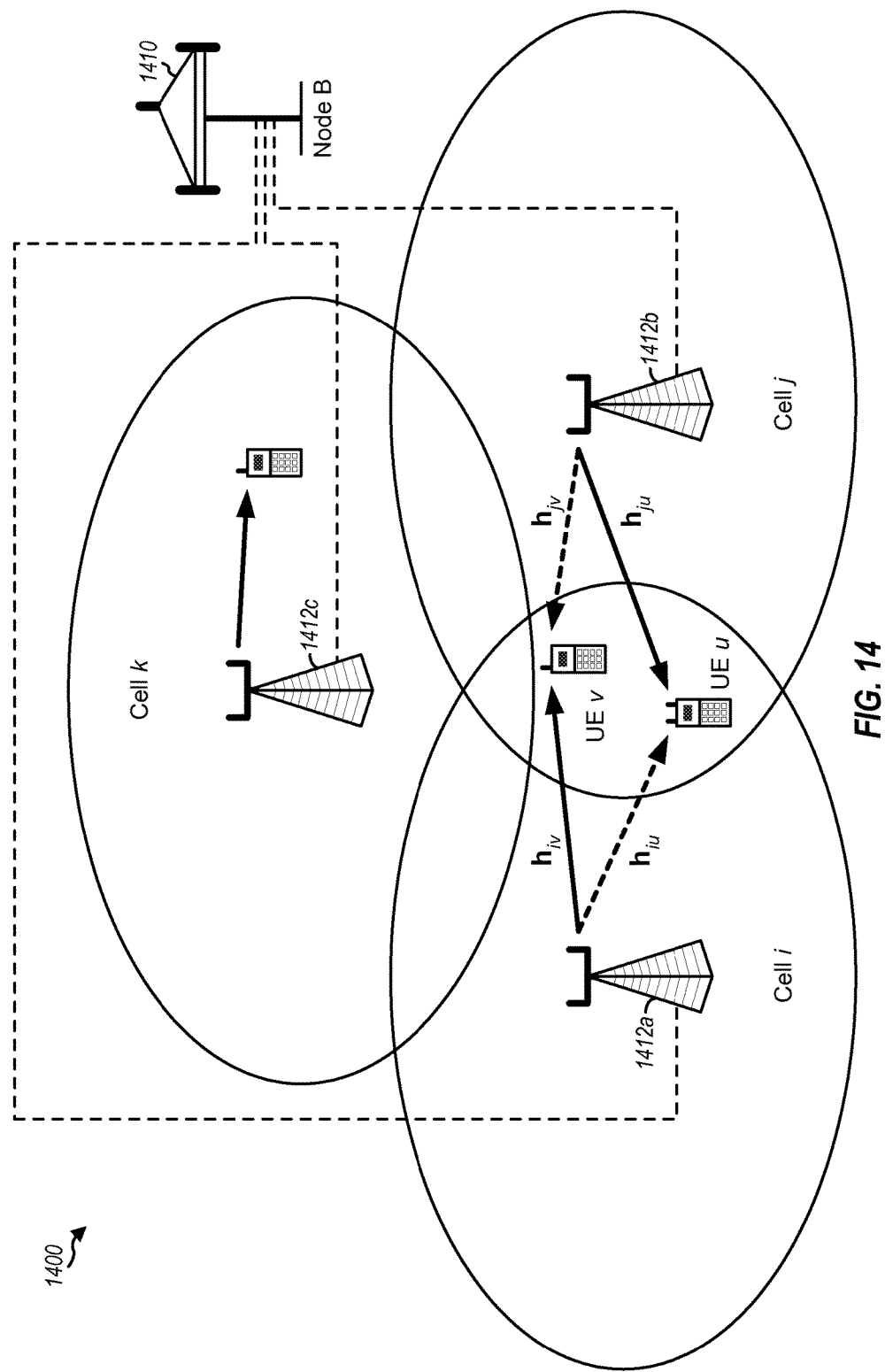
FIG. 14 shows a distributed antenna system.

FIG. 14 shows a distributed antenna system 1400. A Node B 1410 may include multiple (e.g., three) antennas 1412a, 1412b and 1412c that may be placed at different locations to enhance coverage. Antenna 1412a may provide communication coverage for cell i, antenna 1412b may provide communication coverage for cell j, and antenna 1412c may provide communication coverage for cell k. Antennas 1412a, 1412b and 1412c may be coupled to Node B 1410 via wireline or wireless backhaul links, which are shown by dashed lines in FIG. 14. The MU-MIMO and SU-MIMO schemes described above may be applied to system 1400 in analogous manners.

The techniques described herein may improve the performance of cell-edge UEs. Various MU-MIMO and SU-MIMO schemes and different levels of cooperation between cells have been described above. Some schemes utilize high-level coordination where a virtual cell may be formed by multiple physical cells and may transmit data to multiple UEs in the physical cells. Some schemes utilize low-level coordination where each cell may transmit data its UE(s), and improved performance may be achieved by selecting compatible UEs and/or by beamforming away from UEs in neighbor cells.

FIG. 15 shows a design of a process 1500 for receiving data in a wireless communication system. Process 1500 may be performed by a UE (as described below) or by some other entity. The UE may determine channel estimates for multiple cells, which may operate as a virtual cell for data transmission to the UE (block 1512). The multiple cells may belong to a single base station or multiple base stations. The multiple cells may also be associated with multiple antennas distributed at different locations, e.g., as shown in FIG. 14. The UE may send the channel estimates to at least one of the multiple cells, e.g., to a serving cell (block 1514). The UE may receive a data transmission sent by the multiple cells to the UE based on the channel estimates (block 1516). The UE may report CQI information for one or more cells, and the data transmission may be sent based further on the CQI information.

In one design, the data transmission may comprise at least one data stream, and each data stream may be sent by the multiple cells to the UE. In another design, the data transmission may comprise multiple data streams, and each data stream may be sent by one cell to the UE.

In one design, for MU-MIMO, the data transmission may be sent by the multiple cells on resources that may be used to send another data transmission to another UE. In another design, for SU-MIMO, the data transmission may be sent by the multiple cells on resources not used to send data transmissions to other UEs.

In one design, the data transmission may be sent by the multiple cells based on at least one precoding vector determined based on the channel estimates from the UE. In another design, the data transmission may comprise at least one data stream, and each data stream may be sent with precoding by the multiple cells based on a precoding vector for that data stream. In general, a data stream may be sent to the UE with precoding across the multiple cells or with precoding by one cell.

In one design, the multiple cells may each be equipped with a single transmit antenna, and the UE may be equipped with a single receive antenna, e.g., as shown in FIGS. 4 and 10. The channel estimates may comprise a channel gain for each of the multiple cells. In another design, the multiple cells may each be equipped with a single transmit antenna, and the UE may be equipped with multiple receive antennas, e.g., as shown in FIGS. 5, 11 and 12. The UE may determine a channel vector for each cell and may determine a channel gain for the cell based on the channel vector and a receive filter. In yet another design, the multiple cells may each be equipped with multiple transmit antennas, and the UE may be equipped with a single receive antenna, e.g., as shown in FIGS. 6 and 8. The channel estimates may comprise a channel vector for each cell. In yet another design, the multiple cells may each be equipped with multiple transmit antennas, and the UE may be equipped with multiple receive antennas, e.g., as shown in FIGS. 7, 9 and 13. The UE may determine a channel matrix for each cell and may determine a channel vector for the cell based on the channel matrix and a receive filter. The channel estimates for the multiple cells may also comprise other information. For all designs, the number of data streams that may be sent to the UE may be limited by the number of transmit antennas at the multiple cells and the number of receive antennas at the UE.

FIG. 16 shows a design of an apparatus 1600 for receiving data in a wireless communication system. Apparatus 1600 includes a module 1612 to determine channel estimates for multiple cells by a UE, a module 1614 to send the channel estimates from the UE to at least one of the multiple cells, and a module 1616 to receive a data transmission sent by the multiple cells to the UE based on the channel estimates.

FIG. 17 shows a design of a process 1700 for sending data in a wireless communication system. Process 1700 may be performed by a base station or some other entity. Channel estimates for multiple cells may be received from at least one UE (block 1712). The multiple cells may operate as a virtual cell and may belong to a single base station or multiple base stations. At least one data transmission may be sent from the multiple cells to the at least one UE based on the channel estimates, with each data transmission being sent by the multiple cells to a respective UE (block 1714).

In one design, the data transmission for each UE may comprise at least one data stream, and each data stream may be sent by the multiple cells to the UE. In another design, the data transmission for each UE may comprise multiple data streams, and each data stream may be sent by one cell to the UE.

In one design, for MU-MIMO, at least two data transmissions may be sent concurrently by the multiple cells to at least two UEs on common resources. In another design, for SU-MIMO, a single data transmission may be sent by the multiple cells to a single UE on resources not used to send data transmissions to other UEs.

In one design of block 1714, at least one precoding vector may be determined based on the channel estimates, e.g., with zero-forcing or MMSE. Each precoding vector may comprise a weight for each transmit antenna at the multiple cells. Each data transmission may be sent based on a respective precoding vector by the multiple cells to the respective UE. In another design of block 1714, each data transmission may comprise at least one data stream. A precoding vector may be determined for each data stream based on the channel estimates. Each data stream may be sent based on the precoding vector for that data stream by the multiple cells.

FIG. 18 shows a design of an apparatus 1800 for sending data in a wireless communication system. Apparatus 1800 includes a module 1812 to receive channel estimates for multiple cells from at least one UE, and a module 1814 to send at least one data transmission from the multiple cells to the at least one UE based on the channel estimates, with each data transmission being sent by the multiple cells to a respective UE.

FIG. 19 shows a design of a process 1900 for receiving data in a wireless communication system. Process 1900 may be performed by a first UE (as described below) or by some other entity. The first UE may determine a first channel estimate for a first cell (block 1912) and may also determine a second channel estimate for a second cell (block 1914). The first UE may send the first and second channel estimates to at least one of the first and second cells, e.g., to a serving cell (block 1916). The first UE may receive a first data transmission sent by the first cell to the first UE based on the first channel estimate (block 1918). The first UE may receive a second data transmission sent by the second cell to a second UE and steered away from the first UE based on the second channel estimate (block 1920). The first and second data transmissions may be sent concurrently by the first and second cells on the same resources, e.g., the same resource block in LTE.

The first data transmission may be sent by the first cell based on a first precoding vector, which may be determined based on the first channel estimate from the first UE and a third channel estimate from a third UE not served by the first cell. The first data transmission may be steered away from the third UE by the first precoding vector, which may reduce interference to the third UE. The second data transmission may be sent by the second cell based on a second precoding vector, which may be determined based on the second channel estimate from the UE and a fourth channel estimate from the second UE. The second precoding vector may reduce interference to the first UE.

In one design, the first and second cells may each be equipped with multiple transmit antennas, the first UE may be equipped with a single receive antenna, and the first and second channel estimates may each comprise a channel vector. In another design, the multiple cells may each be equipped with multiple transmit antennas, and the first UE may be equipped with multiple receive antennas. The first channel estimate for the first cell may comprise a first channel vector determined based on a first channel matrix for the first cell and a receive filter. The second channel estimate for the second cell may comprise a second channel vector determined based on a second channel matrix for the second cell and the same receive filter. The receive filter may be determined based on an eigenvector of the first channel matrix for the first cell. The first and second channel estimates may also comprise other information.

The first UE may derive a second receive filter based on the first and second channel estimates, e.g., in accordance with MMSE technique, as shown in equation (20). The first UE may perform receive filtering for the first data transmission based on the second receive filter.

FIG. 20 shows a design of an apparatus 2000 for receiving data in a wireless communication system. Apparatus 2000 includes a module 2012 to determine a first channel estimate for a first cell by a first UE, a module 2014 to determine a second channel estimate for a second cell by the first UE, a module 2016 to send the first and second channel estimates from the first UE to at least one of the first and second cells, a module 2018 to receive a first data transmission sent by the first cell to the first UE based on the first channel estimate, and a module 2020 to receive a second data transmission sent by the second cell to a second UE and steered away from the first UE based on the second channel estimate.

FIG. 21 shows a design of a process 2100 for sending data in a wireless communication system. Process 2100 may be performed by a base station or some other entity. A first channel estimate for a cell may be received from a first UE (block 2112). A second channel estimate for the cell may be received from a second UE (block 2114). The first UE may be selected based on low correlation between the first and second channel estimates. A precoding vector may be determined based on the first and second channel estimates, e.g., with zero-forcing or MMSE technique (block 2116). A data transmission may be sent from the cell to the first UE and steered away from the second UE based on the precoding vector (block 2118).

FIG. 22 shows a design of an apparatus 2200 for sending data in a wireless communication system. Apparatus 2200 includes a module 2212 to receive a first channel estimate for a cell from a first UE, a module 2214 to receive a second channel estimate for the cell from a second UE, a module 2216 to determine a precoding vector based on the first and second channel estimates, and a module 2218 to send a data transmission from the cell to the first UE and steered away from the second UE based on the precoding vector.

FIG. 23 shows a design of a process 2300 for scheduling UEs in a wireless communication system. Process 2300 may be performed by a base station or by some other entity. At least one UE may be selected from among multiple UEs in multiple cells, which may operate as a virtual cell (block 2312). At least one data transmission may be sent from the multiple cells to the at least one UE (block 2314). In one design of block 2312, a first UE in a first cell may be selected, e.g., based on at least one metric. A second UE in a second cell may then be selected, e.g., based on low correlation between channel estimates from the first and second UEs. In one design of selecting the second UE, a set of UEs with channel estimates having low correlation with the channel estimate from the first UE may be determined. A UE with a highest metric among the set of UEs may be selected as the second UE. The UE selection in block 2312 may be governed by one or more constraints such as at least one UE being selected from each cell, at most L UEs being selected from any one cell, where L≥1, etc.

FIG. 24 shows a design of an apparatus 2400 for scheduling UEs. Apparatus 2400 includes a module 2412 to select at least one UE among multiple UEs in multiple cells, and a module 2414 to send at least one data transmission from the multiple cells to the at least one UE.

The modules in FIGS. 16, 18, 20, 22 and 24 may comprise processors, electronics devices, hardware devices, electronics components, logical circuits, memories, software codes, firmware codes, etc., or any combination thereof.

Figure 25:
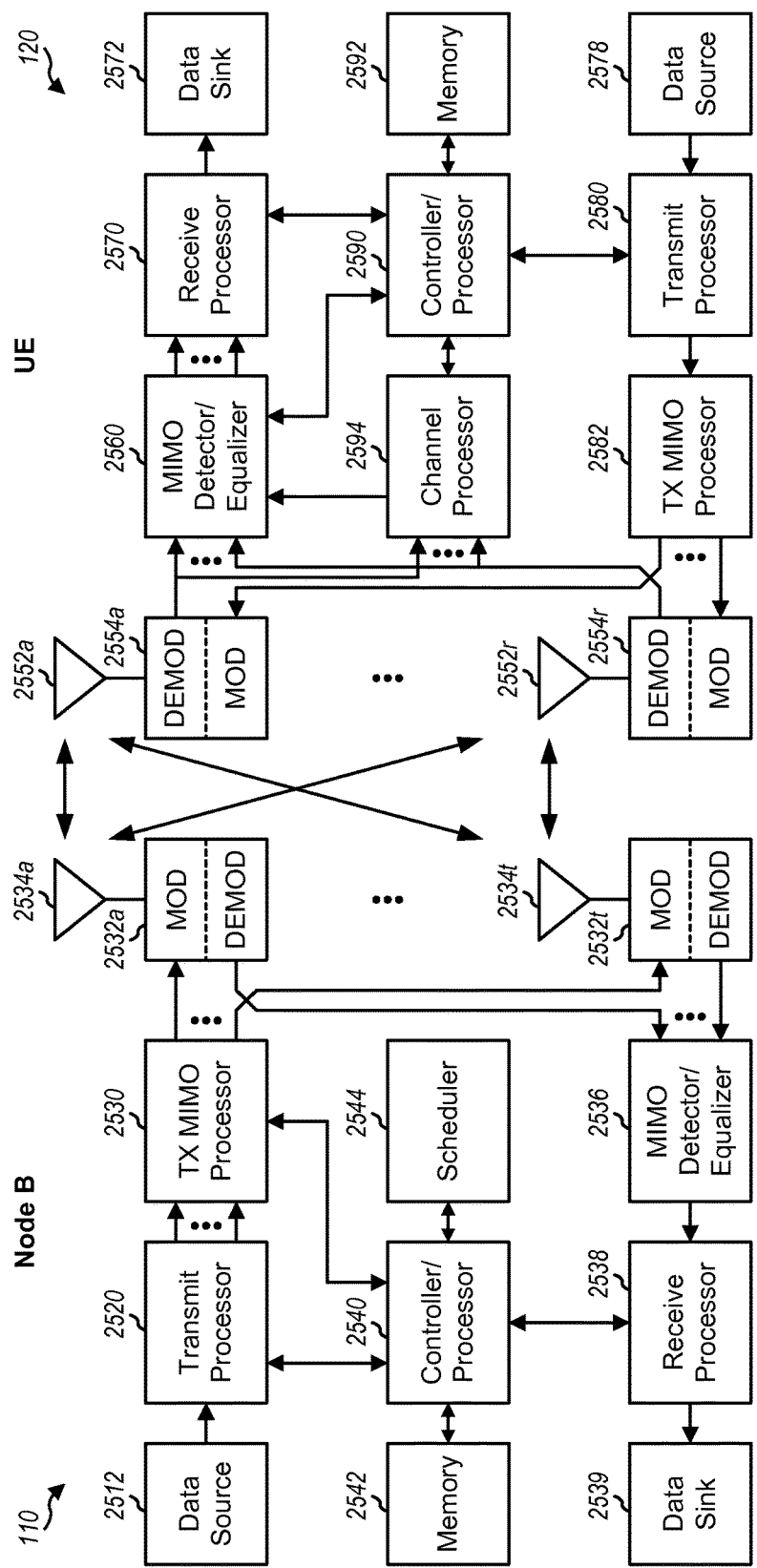
FIG. 25 shows a block diagram of a Node B and a UE.

FIG. 25 shows a block diagram of a design of a Node B 110 and a UE 120, which may be one of the Node Bs and one of the UEs in FIG. 1. Node B 110 may be equipped with T antennas 2534a through 2534t, and UE 120 may be equipped with R antennas 2552a through 2552r, where in general T≥1 and R≥1.

At Node B 110, a transmit processor 2520 may receive data for one or more UEs from a data source 2512, process (e.g., encode, interleave, and modulate) the data for each UE based on one or more modulation and coding schemes selected for the UE, and provide data symbols for all UEs. Transmit processor 2520 may also receive control information from a controller/processor 2540, process the control information, and provide control symbols. Transmit processor 2520 may also generate pilot symbols for a reference signal or pilot. A transmit (TX) MIMO processor 2530 may perform precoding/beamsteering on the data symbols, control symbols, and/or pilot symbols, if applicable, and may provide T output symbol streams to T modulators (MOD) 2532a through 2532t. Each modulator 2532 may process its output symbol stream (e.g., for OFDM, etc.) to obtain an output sample stream. Each modulator 2532 may further condition (e.g., convert to analog, filter, amplify, and upconvert) its output sample stream and generate a downlink signal. T downlink signals from modulators 2532a through 2532t may be transmitted via antennas 2534a through 2534t, respectively.

At UE 120, antennas 2552a through 2552r may receive the downlink signals from Node B 110 and may provide received signals to demodulators (DEMOD) 2554a through 2554r, respectively. Each demodulator 2554 may condition (e.g., filter, amplify, downconvert, and digitize) its received signal to obtain samples and may further process the samples (e.g., for OFDM, etc.) to obtain received symbols. Each demodulator 2554 may provide received data and control symbols to a MIMO detector/equalizer 2560 and may provide received pilot symbols to a channel processor 2594. Channel processor 2594 may estimate the response of the wireless channel from Node B 110 to UE 120 based on the received pilot symbols and may provide a channel estimate for each cell of interest. MIMO detector/equalizer 2560 may perform receive filtering (i.e., MIMO detection/equalization) on the received data and control symbols based on the channel estimates and may provide detected symbols, which are estimates of the transmitted data and control symbols. A receive processor 2570 may process (e.g., demodulate, deinterleave, and decode) the detected symbols, provide decoded data to a data sink 2572, and provide decoded control information to a controller/processor 2590.

UE 120 may evaluate the channel conditions and generate feedback information, which may comprise CDI information, CQI information, and/or other information for the serving cell, cooperating cells, non-serving cells, etc. The feedback information and/or data from a data source 2578 may be processed by a transmit processor 2580, precoded by a TX MIMO processor 2582 (if applicable), and further processed by modulators 2554a through 2554r to generate R uplink signals, which may be transmitted via antennas 2552a through 2552r. At Node B 110, the uplink signals from UE 120 may be received by antennas 2534a through 2534t, processed by demodulators 2532a through 2532t, spatially processed by a MIMO detector/equalizer 2536, and further processed by a receive processor 2538 to recover the feedback information and data sent by UE 120. The decoded data may be provided to a data sink 2539. A controller/processor 2540 may control data transmission to UE 120 based on the decoded feedback information.

Controllers/processors 2540 and 2590 may direct the operation at Node B 110 and UE 120, respectively. Processor 2540 and/or other processors and modules at Node B 110 may perform or direct process 1700 in FIG. 17, process 2100 in FIG. 21, process 2300 in FIG. 23, and/or other processes for the techniques described herein. Processor 2590 and/or other processors and modules at UE 120 may perform or direct process 1500 in FIG. 15, process 1900 in FIG. 19, and/or other processes for the techniques described herein. Memories 2542 and 2592 may store data and program codes for Node B 110 and UE 120, respectively. A scheduler 2544 may select UE 120 and/or other UEs for data transmission on the downlink and/or uplink based on the feedback information (e.g., CDI and CQI information) received from all UEs.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of receiving data in a wireless communication system, comprising:
    determining a channel gain for each of multiple cells by a user equipment (UE) including a first channel gain from a serving cell and a second channel gain from a non-serving cell, wherein the channel gain comprises a gain from each transmit antenna of a cell to each receive antenna of the UE;
    computing, by the UE, a receive filter using at least a set of vectors determined from the first channel gain;
    generating a first virtual channel vector by applying the receive filter to at least a portion of a first channel matrix that includes the first channel gain;
    generating a second virtual channel vector by applying the receive filter to at least a portion of a second channel matrix that includes the second channel gain;
    sending, from the UE, the first virtual channel vector to the serving cell and the second virtual channel vector to the non-serving cell; and
    receiving a data transmission sent by the serving cell based on the first virtual channel vector.

2. The method of claim 1, wherein the data transmission comprises at least one data stream, each data stream being received by the UE from the multiple cells.

3. The method of claim 1, wherein the data transmission comprises multiple data streams, each data stream being received by the UE from one of the multiple cells.

4. The method of claim 1, wherein the data transmission is received from the multiple cells on resources utilized in common with a second UE.

5. The method of claim 1, wherein the data transmission is received from the multiple cells on resources reserved for use by the UE.

6. The method of claim 1, wherein the data transmission comprises at least one data stream, each data stream being sent with cell-specific precoding determined from a cell-specific component of the first virtual channel vector.

7. The method of claim 1, further comprising:
    reporting channel quality indicator (CQI) information for one or more of the multiple cells, wherein the data transmission is sent based further on the CQI information.

8. The method of claim 1, wherein the multiple cells are each equipped with a single transmit antenna, wherein the UE is equipped with a single receive antenna, and wherein generating the first or second virtual channel vectors comprises determining an equivalent channel gain for each of the multiple cells.

9. The method of claim 8, wherein the data transmission comprises a single data stream sent with precoding based on a precoding vector determined from the first virtual channel vector.

10. The method of claim 1, wherein the multiple cells are each equipped with a single transmit antenna, wherein the UE is equipped with multiple receive antennas, and wherein generating the first or second virtual channel vectors comprises:
    determining a channel vector for each of the multiple cells, wherein the determined channel gain is the channel vector, and
    determining an equivalent channel gain for each cell based on the channel vector for the cell and the receive filter.

11. The method of claim 1, wherein the multiple cells are each equipped with multiple transmit antennas, wherein the UE is equipped with a single receive antenna, and wherein generating the first or second virtual channel vectors comprises determining a channel vector for each of the multiple cells, wherein the determined channel gain is the channel vector.

12. The method of claim 1, wherein the multiple cells are each equipped with multiple transmit antennas, wherein the UE is equipped with multiple receive antennas, and wherein generating the first or second virtual channel vectors comprises:
    determining a channel matrix for each of the multiple cells, wherein the determined channel gain is the channel matrix, and
    determining an equivalent channel gain for each cell based on the channel matrix for the cell and the receive filter.

13. The method of claim 1, wherein the multiple cells belong to a single base station.

14. The method of claim 1, wherein the multiple cells are associated with multiple antennas distributed at different locations.

15. An apparatus for receiving data in a wireless communication system, comprising:
  means for determining a channel gain for each of multiple cells by a user equipment (UE) including a first channel gain from a serving cell and a second channel gain from a non-serving cell, wherein the channel gain comprises a gain from each transmit antenna of a cell to each receive antenna of the UE;
  means for computing, by the UE, a receive filter using at least a set of vectors determined from the first channel gain;
  means for generating a first virtual channel vector by applying the receive filter to at least a portion of a first channel matrix that includes the first channel gain;
  means for generating a second virtual channel vector by applying the receive filter to at least a portion of a second channel matrix that includes the second channel gain;
  means for sending, from the UE, the first virtual channel vector to the serving cell and the second virtual channel vector to the non-serving cell; and
  means for receiving a data transmission sent by the serving cell based on the first virtual channel vector.

16. The apparatus of claim 15, wherein the data transmission comprises at least one data stream, each data stream being received by the UE from the multiple cells.

17. The apparatus of claim 15, wherein the data transmission comprises multiple data streams, each data stream being received by the UE from one of the multiple cells.

18. The apparatus of claim 15, wherein the data transmission is received from the multiple cells on resources utilized in common with a second UE.

19. The apparatus of claim 15, wherein the data transmission is received from the multiple cells on resources reserved for use by the UE.

20. The apparatus of claim 15, wherein the data transmission comprises at least one data stream, each data stream being sent with cell-specific precoding determined from a cell-specific component of the first virtual channel vector.

21. An apparatus for wireless communication, comprising:
  at least one processor;
  memory in electronic communication with the processor; and
  instructions stored in the memory and operable, when executed by the processor, to cause the apparatus to:
    determine a channel gain for each of multiple cells by a user equipment (UE) including a first channel gain from a serving cell and a second channel gain from a non-serving cell, wherein the channel gain comprises a gain from each transmit antenna of a cell to each receive antenna of the UE,
    compute a receive filter using at least a set of vectors determined from the first channel gain,
    generate a first virtual channel vector by applying the receive filter to at least a portion of a first channel matrix that includes the first channel gain,
    generate a second virtual channel vector by applying the receive filter to at least a portion of a second channel matrix that includes the second channel gain,
    send, from the UE, the first virtual channel vector to the serving cell and the second virtual channel vector to the non-serving cell, and
    receive a data transmission sent by the serving cell based on the first virtual channel vector.

22. The apparatus of claim 21, wherein the data transmission comprises at least one data stream, each data stream being received by the UE from the multiple cells.

23. The apparatus of claim 21, wherein the data transmission comprises multiple data streams, each data stream being received by the UE from one of the multiple cells.

24. The apparatus of claim 21, wherein the instructions are operable to cause the apparatus to:
  receive data transmission from the multiple cells on resources utilized in common with a second UE.

25. The apparatus of claim 21, wherein the instructions are operable to cause the apparatus to:
  receive data transmission from the multiple cells on resources reserved for use by the UE.

26. The apparatus of claim 21, wherein the data transmission comprises at least one data stream, each data stream being sent with cell-specific precoding determined from a cell-specific component of the first virtual channel vector.

27. A computer program product, comprising:
  a non-transitory computer-readable storage medium comprising:
    code for causing at least one computer to determine a channel gain for each of multiple cells by a user equipment (UE) including a first channel gain from a serving cell and a second channel gain from a non-serving cell, wherein the channel gain comprises a gain from each transmit antenna of a cell to each receive antenna of the UE,
    code for causing the at least one computer to compute a receive filter using at least a set of vectors determined from the first channel gain,
    code for causing the at least one computer to generate a first virtual channel vector by applying the receive filter to at least a portion of a first channel matrix that includes the first channel gain,
    code for causing the at least one computer to generate a second virtual channel vector by applying the receive filter to at least a portion of a second channel matrix that includes the second channel gain;
    code for causing the at least one computer to send, from the UE, the first virtual channel vector to the serving cell and the second virtual channel vector to the non-serving cell, and
    code for causing the at least one computer to receive a data transmission sent by the serving cell based on the first virtual channel vector.

28. A method of sending data in a wireless communication system, comprising:
  receiving a first virtual channel vector from a user equipment (UE), the first virtual channel vector generated at the UE by applying a receive filter to at least a portion of a first channel matrix that includes a first channel gain from a serving cell determined at the UE, the first virtual channel vector being generated further with a second virtual channel vector, the second virtual channel vector generated at the UE by applying the receive filter to at least a portion of a second channel matrix that includes a second channel gain from a non-serving cell determined at the UE, wherein the receive filter is computed using at least a set of vectors determined from the first channel gain, and wherein each channel gain comprises a gain from each transmit antenna of a cell to each receive antenna of the UE; and
  sending at least one data transmission from the serving cell to the UE based on the first virtual channel vector, the at least one data transmission being sent to the UE in coordination with at least the non-serving cell out of multiple cells.

29. The method of claim 28, wherein the at least one data transmission for the UE comprises at least one data stream, each data stream being sent by the multiple cells to the UE.

30. The method of claim 28, wherein the at least one data transmission for the UE comprises multiple data streams, each data stream being sent by one of the multiple cells to the UE.

31. The method of claim 28, wherein the sending the at least one data transmission comprises sending at least two data transmissions by the multiple cells to at least two UEs on common resources.

32. The method of claim 28, wherein the sending the at least one data transmission comprises sending a single data transmission by the multiple cells to the UE on resources not used to send data transmissions to other UEs.

33. The method of claim 28, wherein the sending the at least one data transmission comprises determining at least one precoding vector based on the first virtual channel vector, and sending each data transmission based on a respective precoding vector by the multiple cells to the UE.

34. The method of claim 33, wherein the at least one precoding vector is determined based on zero-forcing or minimum mean square error (MMSE) technique.

35. The method of claim 33, wherein each precoding vector comprises a weight for each of multiple transmit antennas at the multiple cells.

36. The method of claim 28, wherein each data transmission comprises at least two data streams, and wherein the sending the at least one data transmission comprises:
    determining a precoding vector for each data stream based on the first virtual channel vector, and sending each data stream based on the precoding vector for the data stream by the multiple cells.

37. An apparatus for wireless communication, comprising:
    means for receiving a first virtual channel vector from a user equipment (UE), the first virtual channel vector generated at the UE by applying a receive filter to at least a portion of a first channel matrix that includes a first channel gain from a serving cell determined at the UE, the first virtual channel vector being generated further with a second virtual channel vector, the second virtual channel vector generated at the UE by applying the receive filter to at least a portion of a second channel matrix that includes a second channel gain from a non-serving cell determined at the UE, wherein the receive filter is computed using at least a set of vectors determined from the first channel gain, and wherein each channel gain comprises a gain from each transmit antenna of a cell to each receive antenna of the UE; and
    means for sending at least one data transmission from the serving cell to the UE based on the first virtual channel vector, the at least one data transmission being sent to the UE in coordination with at least the non-serving cell out of multiple cells.

38. The apparatus of claim 37, wherein the at least one data transmission for the UE comprises at least one data stream, each data stream being sent by the multiple cells to the UE.

39. The apparatus of claim 37, wherein the at least one data transmission for the UE comprises multiple data streams, each data stream being sent by one of the multiple cells to the UE.

40. The apparatus of claim 37, wherein the means for sending the at least one data transmission comprises means for determining at least one precoding vector based on the first virtual channel vector, and means for sending each data transmission based on a respective precoding vector by the multiple cells to the UE.

41. The apparatus of claim 37, wherein each data transmission comprises at least two data streams, and wherein the means for sending the at least one data transmission comprises means for determining a precoding vector for each data stream based on the first virtual channel vector, and means for sending each data stream based on the precoding vector for the data stream by the multiple cells.

42. The method of claim 1, wherein the first or second virtual channel vectors are comprised of a plurality of components, and wherein each component comprises an equivalent channel gain associated with a communications link between the UE and one of the multiple cells.

43. The method of claim 1, wherein components of the first or second virtual channel vectors are generated based on the receive filter.

44. The apparatus of claim 15, wherein the first or second virtual channel vectors are comprised of a plurality of components, and wherein each component comprises an equivalent channel gain associated with a communications link between the UE and one of the multiple cells.

45. The apparatus of claim 15, wherein components of the first or second virtual channel vector are generated based on the receive filter.

46. The apparatus of claim 21, wherein the first or second virtual channel vectors are comprised of a plurality of components, and wherein each component comprises an equivalent channel gain associated with a communications link between the UE and one of the multiple cells.

47. The apparatus of claim 21, wherein components of the first or second virtual channel vector are generated based on the receive filter.

48. The computer program product of claim 27, wherein the first or second virtual channel vectors are comprised of a plurality of components, and wherein each component comprises an equivalent channel gain associated with a communications link between the UE and one of the multiple cells.

49. The computer program product of claim 27, wherein components of the first or second virtual channel vector are generated based on the receive filter.

50. The method of claim 28, further comprising:
    determining precoding information for data transmissions to the UE by the multiple cells based on information obtained from the first or second virtual channel vector.

51. The method of claim 50, wherein the precoding information is cell-specific.

52. The method of claim 50, wherein the precoding information is common to the multiple cells.

53. The apparatus of claim 37, further comprising:
    means for determining precoding information for data transmissions to the UE by the multiple cells based on information obtained from the first or second virtual channel vector.

54. The method of claim 53, wherein the precoding information is cell-specific.

55. The method of claim 53, wherein the precoding information is common to the multiple cells.

* * * * *